(12) United States Patent
Agiwal et al.

(10) Patent No.: US 11,606,812 B2
(45) Date of Patent: Mar. 14, 2023

(54) METHOD OF PRIORITIZING RANDOM ACCESS FOR MULTIMEDIA PRIORITY AND MISSION CRITICAL SERVICES AND APPARATUS THEREOF

(71) Applicant: Samsung Electronics Co., Ltd., Suwon-si (KR)

(72) Inventors: Anil Agiwal, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/215,536

(22) Filed: Mar. 29, 2021

(65) Prior Publication Data

US 2021/0307060 A1    Sep. 30, 2021

Related U.S. Application Data

(60) Provisional application No. 63/000,902, filed on Mar. 27, 2020.

(51) Int. Cl.
*H04W 74/00* (2009.01)
*H04B 7/06* (2006.01)
(Continued)

(52) U.S. Cl.
CPC ........ *H04W 74/006* (2013.01); *H04B 7/0695* (2013.01); *H04W 36/00837* (2018.08);
(Continued)

(58) Field of Classification Search
CPC ......... H04W 74/006; H04W 36/00837; H04W 74/008; H04W 74/0833; H04W 76/19;
(Continued)

(56) References Cited

U.S. PATENT DOCUMENTS

| 2006/0084432 A1* | 4/2006 | Balasubramanian ........................ H04W 74/0875 455/445 |
|---|---|---|
| 2016/0262047 A1* | 9/2016 | Yi ........................ H04W 74/006 |
| 2018/0317264 A1* | 11/2018 | Agiwal ............... H04W 74/085 |
| 2020/0100296 A1 | 3/2020 | Roy et al. |

FOREIGN PATENT DOCUMENTS

| EP | 3 603 306 A1 | 2/2020 |
|---|---|---|
| KR | 10-2019-0116806 A | 10/2019 |
| WO | 2020/033406 A2 | 2/2020 |

OTHER PUBLICATIONS

Ericsson et al.; Introduction of DL RRC segmentation; 3GPP TSG-RAN2 Meeting #109; R2-2002161; Online; Feb. 24, 2020-Mar. 6, 2020.

(Continued)

*Primary Examiner* — Thai Nguyen
(74) *Attorney, Agent, or Firm* — Jefferson IP Law, LLP

(57) ABSTRACT

A communication method and system for converging a $5^{th}$ generation (5G) communication system for supporting higher data rates beyond a $4^{th}$ generation (4G) system with a technology for Internet of things (IoT) are provided. The communication method and system includes intelligent services based on the 5G communication technology and the IoT-related technology, such as smart home, smart building, smart city, smart car, connected car, health care, digital education, smart retail, security and safety services. The method includes receiving and selectively applying at least one of a first set of random access prioritization parameters, a second set of random access prioritization parameters, or a third set of random access prioritization parameters, based on whether a random access procedure is initiated for beam failure recovery or handover.

20 Claims, 6 Drawing Sheets

(51) Int. Cl.
*H04W 76/19* (2018.01)
*H04W 74/08* (2009.01)
*H04W 36/00* (2009.01)

(52) U.S. Cl.
CPC ..... *H04W 74/008* (2013.01); *H04W 74/0833* (2013.01); *H04W 76/19* (2018.02)

(58) Field of Classification Search
CPC ......... H04W 36/0055; H04W 74/0866; H04W 74/004; H04W 74/02; H04B 7/0695
See application file for complete search history.

(56) References Cited

OTHER PUBLICATIONS

3GPP; 3rd Generation Partnership Project; Technical Specification Group Radio Access Network; NR; Medium Access Control (MAC) protocol specification (Release 15); 3GPP TS 38.321 V15.8.0; Dec. 2019; Valbonne, France.
International Search Report dated Jul. 1, 2021; International Appln. No. PCT/KR2021/003880.
Perspecta Labs et al: "PRACH prioritization for MPS and MCS", R2-2002103, Mar. 12, 2020.
Samsung Electronics: "Corrections to PRACH priorization procedure for MPS and MCS", R2-2006180, Jun. 25, 2020.
Extended European Search Report dated Dec. 19, 2022, issued in a counterpart European Application No. 21777107.0-1215.

* cited by examiner

METHOD OF PRIORITIZING RANDOM ACCESS FOR MULTIMEDIA PRIORITY AND MISSION CRITICAL SERVICES AND APPARATUS THEREOF

CROSS-REFERENCE TO RELATED APPLICATION(S)

This application is based on and claims priority under 35 U.S.C. § 119(e) of a U.S. Provisional Patent Application Ser. No. 63/000,902, filed on Mar. 27, 2020, in the U.S. Patent and Trademark Office, the disclosure of which is incorporated by reference herein in its entirety.

BACKGROUND

1. Field

The disclosure relates to a method for prioritizing random access (RA) for multimedia prioritized services (MPS) and mission critical services (MCS). More particularly, the disclosure relates to a method, a terminal, and a base station for performing an RA procedure in a wireless communication system.

2. Description of Related Art

To meet the demand for wireless data traffic which has increased since deployment of $4^{th}$ generation (4G) communication systems, efforts have been made to develop an improved $5^{th}$ generation (5G) or pre-5G communication system. Therefore, the 5G or pre-5G communication system is also referred to as a 'beyond 4G network' or a 'post long-term evolution (LTE) System.' The 5G wireless communication system supports not only lower frequency bands, but also higher frequency (millimeter (mm) Wave) bands, e.g., 10 gigahertz (GHz) to 100 GHz bands, so as to accomplish higher data rates. To mitigate propagation loss of the radio waves and increase the transmission distance, beamforming, massive multiple-input multiple-output (MIMO), full dimensional MIMO (FD-MIMO), array antenna, analog beam forming, and large-scale antenna techniques are being considered in the design of the 5G wireless communication system. In addition, in 5G communication systems, development for system network improvement is underway based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like. In the 5G system, frequency and quadrature amplitude modulation (FQAM), which is a combination of hybrid frequency shift keying (FSK) and quadrature amplitude modulation (QAM), and sliding window superposition coding (SWSC) as an advanced coding modulation (ACM), filter bank multi-carrier (FBMC), non-orthogonal multiple access (NOMA), and sparse code multiple access (SCMA) as an advanced access technology, have been also developed.

In a similar regard, the Internet, which is a human centered connectivity network where humans generate and consume information, is now evolving into an internet of things (IoT) where distributed entities, such as things, exchange and process information without human intervention. The internet of everything (IoE), which is a combination of IoT technology and big data processing technology through connection with a cloud server, has also emerged. As technology elements, such as "sensing technology," "wired/wireless communication and network infrastructure," "service interface technology," and "security technology" have been demanded for IoT implementation, a sensor network, a machine-to-machine (M2M) communication, machine-type communication (MTC), and so forth, have been recently researched. Such an IoT environment may provide intelligent Internet technology services that create new value to human life by collecting and analyzing data generated among connected things. In this case, IoT may be applied to a variety of fields including a smart home, a smart building, a smart city, a smart car or connected cars, a smart grid, health care, smart appliances, and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be an example of convergence between the 5G technology and the IoT technology.

In recent years, several broadband wireless technologies have been developed to meet the growing number of broadband subscribers and to provide more and better applications and services such as these. The second generation (2G) wireless communication system has been developed to provide voice services while ensuring the mobility of users. The third generation (3G) wireless communication system supports the voice service and data service. The 4G wireless communication system has been developed to provide high-speed data service. However, the 4G wireless communication system currently suffers from a lack of resources to meet the growing demand for high speed data services. Therefore, the 5G wireless communication system (also referred as next generation radio or new radio (NR)) is being developed to meet the growing demand of various services with diverse requirements, e.g., high-speed data services, support ultra-reliability and low-latency applications.

In addition, the 5G wireless communication system is expected to address different use cases having different requirements in terms of data rate, latency, reliability, mobility, etc. However, it is expected that the design of the air-interface of the 5G wireless communication system will be flexible enough to serve user equipments (UEs) having different capabilities depending on the use case and market segment in which a UE caters service to the end customer. Use cases that the 5G wireless communication system is expected to address include enhanced mobile broadband (eMBB), massive machine type communication (m-MTC), ultra-reliable low-latency communication (URLL), etc. The eMBB requirements (e.g., tens of gigabits per second (Gbps) data rate, low-latency, high-mobility, and so on) address the market segment representing the wireless broadband subscribers needing internet connectivity everywhere, all the time, and on the go. The m-MTC requirements (e.g., very high connection density, infrequent data transmission, very long battery life, low mobility address, and so on) address the market segment representing the IoT/IoE envisioning connectivity of billions of devices. The URLL requirements (e.g., very low latency, very high reliability, variable mobility, and so forth) address the market segment representing the industrial automation application and vehicle-to-vehicle/vehicle-to-infrastructre communication that is foreseen as one of the enablers for autonomous cars.

The 5G wireless communication system supports a standalone mode of operation as well as dual connectivity (DC). In DC, a multiple receive (Rx)/transmit (Tx) UE may be configured to utilize resources provided by two different nodes (or node Bs (NBs)) connected via a non-ideal backhaul. One node acts as a master node (MN) and the other node acts as a secondary node (SN). The MN and SN are connected via a network interface and at least the MN is connected to the core network. NR also supports multi-radio access technology (RAT) DC (MR-DC) operation whereby a UE in radio resource control (RRC)_CONNECTED is configured to utilize radio resources provided by two distinct schedulers, located in two different nodes connected via a non-ideal backhaul and providing either evolved universal mobile telecommunications system (UNITS) terrestrial radio access (E-UTRA) (i.e., if the node is a new generation-evolved node B (ng-eNB)) or NR access (i.e., if the node is a next generation node B (gNB)).

In NR, for a UE in RRC_CONNECTED not configured with carrier aggregation (CA)/DC, there is only one serving cell, comprising the primary cell (PCell). For a UE in RRC_CONNECTED configured with CA/DC, the term 'serving cells' is used to denote the set of cells comprising the special cell(s) (SpCell(s)) and all secondary cells (SCells).

In NR, the term 'master cell group (MCG)' refers to a group of serving cells associated with the MN, comprising the PCell and optionally one or more SCells. In NR, the term 'secondary cell group (SCG)' refers to a group of serving cells associated with the SN, comprising the primary SCG cell (PSCell) and optionally one or more SCells. In NR, PCell refers to a serving cell in MCG, operating on the primary frequency, in which the UE either performs the initial connection establishment procedure or initiates the connection re-establishment procedure. In NR, for a UE configured with CA, an SCell is a cell providing additional radio resources on top of an SpCell. PSCell refers to a serving cell in SCG in which the UE performs random access (RA) when performing the reconfiguration with synchronization procedure. For DC operation, the term 'SpCell' refers to the PCell of the MCG or the PSCell of the SCG; otherwise, the term 'SpCell' refers to the PCell.

In the 5G wireless communication system, gNB or base station in cell broadcast synchronization signal and physical broadcast channel (PBCH) block (SSB) consists of primary and secondary synchronization signals (PSS, SSS) and system information (SI). SI includes common parameters needed to communicate in a cell. In the 5G wireless communication system (also referred to as NR), SI is divided into the master information block (MIB) and a number of SI blocks (SIBs) where:

the MIB is always transmitted on the PBCH with a periodicity of 80 ms and repetitions made within 80 ms, and it includes parameters that are needed to acquire SIB1 from the cell;

the SIB1 is transmitted on the downlink shared channel (DL-SCH) with a periodicity of 160 ms and variable transmission repetition. The default transmission repetition periodicity of SIB1 is 20 ms, but the actual transmission repetition periodicity is up to network implementation. SIB1 includes information regarding the availability and scheduling (e.g., mapping of SIBs to SI message, periodicity, and SI-window size) of other SIBs with an indication whether one or more SIBs are only provided on-demand and, in that case, the configuration needed by the UE to perform the SI request. SIB1 is cell-specific SIB; and SIBs other than SIB1 are carried in SI messages, which are transmitted on the DL-SCH. Only SIBs having the same periodicity can be mapped to the same SI message.

In the 5G wireless communication system, bandwidth adaptation (BA) is supported. With BA, the receive and transmit bandwidth of a UE need not be as large as the bandwidth of the cell and can be adjusted, the width can be ordered to change (e.g., to shrink during a period of low activity to save power), the location can move in the frequency domain (e.g., to increase scheduling flexibility), and the subcarrier spacing (SCS) can be ordered to change (e.g., to allow different services). A subset of the total cell bandwidth of a cell is referred to as a bandwidth part (BWP). BA is achieved by configuring an RRC connected UE with BWP(s) and informing the UE of which of the configured BWPs is currently the active one. When BA is configured, the UE only has to monitor physical downlink control channel (PDCCH) on the one active BWP, i.e., it does not have to monitor PDCCH on the entire downlink (DL) frequency of the serving cell. In an RRC connected state, the UE is configured with one or more DL and UL BWPs, for each configured serving cell (i.e., PCell or SCell). For an activated serving cell, there is always one active UL and DL BWP at any point in time. Upon addition of an SpCell or activation of an SCell, the DL BWP and UL BWP indicated by firstActiveDownlinkBWP-Id and firstActiveUplinkBWP-Id respectively are active without receiving a PDCCH indicating a DL assignment or a UL grant. The active BWP for a serving cell is indicated by either RRC or PDCCH. In the RRC inactive and RRC idle state, the UE performs DL and UL operations using an initial DL BWP and an initial UL BWP respectively. The configuration of the initial DL BWP and the initial UL BWP is signaled using SI. Note that in RRC connected state, one of the configured BWP can be the initial BWP as well.

In the 5G wireless communication system, RA is supported. RA is used to achieve uplink (UL) time synchronization. RA is used during initial access, handover, RRC connection re-establishment procedures, scheduling request transmissions, small data transmission, SI request, secondary cell group (SCG) addition/modification, beam failure recovery (BFR), and data or control information transmission in UL by a non-synchronized UE in an RRC CONNECTED state. Several types of RA procedures are supported. The RA configuration (e.g., preambles, PRACH occasions, etc.) for performing RA procedure is configured separately for each BWP.

Contention Based RA (CBRA)

This is also referred as 4-step CBRA. In this type of RA, the UE first transmits an RA preamble (also referred as message 1 (Msg1)), and then waits for a random access response (RAR) in the RAR window. The RAR is also referred as message 2 (Msg2). Next generation node B (gNB) transmits the RAR on the physical downlink shared channel (PDSCH). A PDCCH scheduling the PDSCH carrying the RAR is addressed to an RA-radio network temporary identifier (RA-RNTI). The RA-RNTI identifies the time-frequency resource (also referred to as a physical RA channel (PRACH) occasion or a PRACH transmission (TX) occasion or an RA channel (RACH) occasion) in which the RA preamble was detected by the gNB. The RA-RNTI is calculated by Equation 1 as follows:

$$RA\text{-}RNTI = 1 + s\_id + 14 * t\_id + 14 * 80 * f\_id + 14 * 80 * 8 * ul\_carrier\_id \quad \text{Equation 1}$$

where s_id is the index of the first orthogonal frequency division multiplexing (OFDM) symbol of the PRACH occasion, where the UE has transmitted Msg1, i.e., the RA preamble; $0 \leq s\_id < 14$; t_id is the index of the first slot of the PRACH occasion ($0 \leq t\_id < 80$); f_id is the index of the PRACH occasion within the slot in the frequency domain ($0 \leq f\_id < 8$); and ul_carrier_id is the UL carrier used for Msg1 transmission (0 for normal UL (NUL) carrier and 1 for supplementary UL (SUL) carrier. Several RARs for various RA preambles detected by the gNB can be multiplexed in the same RAR media access control (MAC) protocol data unit (PDU) by the gNB. An RAR in a MAC PDU corresponds to a UE's RA preamble transmission if the RAR includes an RA preamble identifier (RAPID) of the RA preamble transmitted by the UE. If the RAR corresponding to its RA preamble transmission is not received during the RAR window and the UE has not yet transmitted the RA preamble for a configurable (e.g., configured by the gNB in a RACH configuration) number of times, the UE returns to the first step, i.e., selects an RA resource (preamble/PRACH occasion) and transmits the RA preamble. A backoff may be applied before returning to the first step.

If the RAR corresponding to the RA preamble transmission is received, the UE transmits a message 3 (Msg3) in a UL grant received in RAR. Msg3 includes messages such as an RRC connection request, an RRC connection re-establishment request, an RRC handover confirm, a scheduling request, an SI request, etc. Msg3 may include the UE identity (i.e., a cell-radio network temporary identifier (C-RNTI), a system architecture evolution (SAE)-temporary mobile subscriber identity (S-TMSI), or a random number). After transmitting the Msg3, the UE starts a contention resolution timer. While the contention resolution timer is running, if the UE receives a PDCCH addressed to the C-RNTI included in Msg3, contention resolution is considered successful, a contention resolution timer is stopped, and the RA procedure is completed. While the contention resolution timer is running, if the UE receives a contention resolution MAC control element (CE) including the UE's contention resolution identity (e.g., the first X bits of a common control channel (CCCH) service data unit (SDU) transmitted in Msg3), contention resolution is considered successful, the contention resolution timer is stopped, and the RA procedure is completed. If the contention resolution timer expires and the UE has not yet transmitted the RA preamble for a configurable number of times, the UE returns to the first step, i.e., selects an RA resource (preamble/ PRACH occasion) and transmits the RA preamble.

A backoff is applied before returning to the first step if backoff index is received in RAR after transmitting the RA preamble. The UE retransmits the RA preamble after a time period which is randomly selected between 0 and SCALING_FACTOR_BI*backoff value, where SCALING_FACTOR_BI is set to 1 or scalingFactorBI. scalingFactorBI is optionally signaled by gNB. The backoff value corresponding to backoff index received in RAR is obtained by the UE from a pre-defined backoff table. During the RA preamble retransmission, the UE also ramps up the power by PowerRampingStep or powerRampingStepHighPriority. PowerRampingStep or powerRampingStepHighPriority is signaled by gNB. PowerRampingStep is configured in RACH configuration in SI and dedicated signaling and is cell specific. powerRampingStepHighPriority is dedicatedly configured to the UE separately for RA initiated for BFR configuration and RA initiated for handover. If RA procedure is initiated for BFR and powerRampingStepHighPriority is not configured by gNB for BFR, the UE uses PowerRampingStep. If RA procedure is initiated for handover and powerRampingStepHighPriority is not configured by gNB for handover, the UE uses PowerRampingStep. scalingFactorBI is dedicatedly configured to the UE separately for RA initiated for BFR configuration and RA initiated for handover. If RA procedure is initiated for BFR and scalingFactorBI is not configured by gNB for BFR, the UE sets SCALING_FACTOR_BI to 1. Otherwise, SCALING_FACTOR_BI is set to scalingFactorBI. If RA procedure is initiated for handover and scalingFactorBI is not configured by gNB for handover, the UE sets SCALING_FACTOR_BI to 1. Otherwise, SCALING_FACTOR_BI is set to scalingFactorBI. powerRampingStepHighPriority and scalingFactorBI for BFR is BWP specific, i.e., the configuration is different for different BWP. Network may not configure powerRampingStepHighPriority and scalingFactorBI for BFR in every configured BWP. If powerRampingStepHighPriority and scalingFactorBI for BFR is not configured in a BWP and that BWP is used for RA initiated for BFR, the UE applies PowerRampingStep and sets SCALING_FACTOR_BI to 1.

Contention Free RA (CFRA)

This is also referred to as legacy CFRA or 4-step CFRA. A CFRA procedure is used for scenarios such as handover where low latency is required, timing advance establishment for S Cell, etc. An eNB (or gNB) assigns to the UE a dedicated RA preamble. The UE transmits the dedicated RA preamble. The eNB (or gNB) transmits the RAR on a PDSCH addressed to RA-RNTI. The RAR conveys an RA preamble identifier and timing alignment information. The RAR may also include a UL grant. The RAR is transmitted in an RAR window similar to a CBRA procedure. CFRA is considered successfully completed after receiving the RAR including an RAPID of the RA preamble transmitted by the UE. In case RA is initiated for BFR, CFRA is considered successfully completed if PDCCH addressed to C-RNTI is received in a search space for BFR. If the RAR window expires and RA is not successfully completed and the UE has not yet transmitted the RA preamble for a configurable (i.e., configured by the gNB in a RACH configuration) number of times, the UE retransmits the RA preamble.

For certain events such as handover and BFR, if dedicated preamble(s) are assigned to the UE, during the first step of RA procedure, i.e., during RA resource selection for Msg1 transmission, the UE determines whether to transmit the dedicated preamble or a non-dedicated preamble. Dedicated preambles are typically provided for a subset of SSBs/ channel state information reference signals (CSI-RSs). If there is no SSB/CSI-RS having DL reference signal received power (RSRP) above a threshold among the SSBs/CSI-RSs for which CFRA resources (i.e., dedicated preambles/ PRACH occasions) are provided by the gNB, the UE selects a non-dedicated preamble. Otherwise, the UE selects the dedicated preamble. During the RA procedure, one RA attempt may be CFRA while another RA attempt may be CBRA.

If an RA random access attempt is not successful, before the next RA attempt based on CBRA, the UE performs backoff if backoff index is received in RAR after transmitting the RA preamble during the RA attempt. The UE retransmits the RA preamble after a time period which is randomly selected between 0 and SCALING_FACTOR_BI*backoff value, where SCALING_FACTOR_BI is set to 1 or scalingFactorBI. scalingFactorBI is optionally signaled by gNB. The backoff value corresponding to backoff index received in RAR is obtained by the UE from a pre-defined backoff table. scalingFactorBI is dedicatedly configured to the UE separately for RA initiated for BFR configuration and RA initiated for handover. If RA procedure is initiated for BFR and scalingFactorBI is not configured by gNB for BFR, the UE sets SCALING_FACTOR_BI to 1. Otherwise, SCALING_FACTOR_BI is set to scalingFactorBI. If RA procedure is initiated for handover and scalingFactorBI is not configured by gNB for handover, the UE sets SCALING_FACTOR_BI to 1. Otherwise, SCALING_FACTOR_BI is set to scalingFactorBI.

If an RA attempt is not successful, during the next RA attempt the UE also ramps up the power by PowerRampingStep or powerRampingStepHighPriority. PowerRampingStep or powerRampingStepHighPriority is signaled by gNB. PowerRampingStep is configured in RACH configuration in SI and dedicated signaling and is cell specific. powerRampingStepHighPriority is dedicatedly configured to the UE separately for RA initiated for BFR configuration and RA initiated for handover. If RA procedure is initiated for BFR and powerRampingStepHighPriority is not configured by gNB for BFR, the UE uses PowerRampingStep. If RA procedure is initiated for handover and powerRampingStepHighPriority is not configured by gNB for handover, the UE uses PowerRampingStep. powerRampingStepHighPriority and scalingFactorBI for BFR is BWP specific, i.e., the configuration is different for different BWP. The network may not configure powerRampingStepHighPriority and scalingFactorBI for BFR in every configured BWP. If powerRampingStepHighPriority and scalingFactorBI for BFR is not configured in a BWP and that BWP is used for RA initiated for BFR, the UE applies PowerRampingStep and sets SCALING_FACTOR_BI to 1.

2-Step CBRA

In the first step of 2-step CBRA, the UE transmits an RA preamble on a PRACH and a payload (i.e., MAC PDU) on a PUSCH. The RA preamble and payload transmission is also referred to as message A (MSGA). In the second step, after MSGA transmission, the UE monitors for a response from the network (i.e., from the gNB) within a configured window. The response is also referred as message B (MSGB). If a CCCH SDU was transmitted in the MSGA payload, the UE performs contention resolution using the contention resolution information in MSGB. The contention resolution is successful if the contention resolution identity received in MSGB matches the first 48 bits of the CCCH SDU transmitted in MSGA. If a C-RNTI was transmitted in the MSGA payload, the contention resolution is successful if the UE receives a PDCCH addressed to the C-RNTI. If contention resolution is successful, the RA procedure is considered successfully completed. Instead of contention resolution information corresponding to the transmitted MSGA, MSGB may include fallback information corresponding to the RA preamble transmitted in MSGA. If the fallback information is received, the UE transmits Msg3 and performs contention resolution using Msg4 as in the CBRA procedure. If contention resolution is successful, the RA procedure is considered successfully completed. If contention resolution fails upon fallback (i.e., upon transmitting Msg3), the UE retransmits MSGA. If a configured window in which the UE monitors a network response after transmitting MSGA expires and the UE has not received MSGB including contention resolution information or fallback information as explained above, the UE retransmits MSGA. If the RA procedure is not successfully completed after transmitting MSGA a configurable number of times, the UE fallbacks to the 4-step RA procedure, i.e., the UE only transmits the RA preamble.

Note that backoff and power ramping is applied for MSGA retransmission as in a legacy RA procedure.

An MSGA payload may include one or more of CCCH SDU, a dedicated control channel (DCCH) SDU, a dedicated traffic channel (DTCH) SDU, a buffer status report (BSR) MAC CE, a power headroom report (PHR) MAC CE, SSB information, a C-RNTI MAC CE, or padding. MSGA may include a UE ID (e.g., random ID, S-TMSI, C-RNTI, resume ID, etc.) along with a preamble in the first step. The UE ID may be included in the MAC PDU of MSGA. A UE ID such as C-RNTI may be carried in a MAC CE, wherein the MAC CE is included in a MAC PDU. Other UE IDs (such as random ID, S-TMSI, C-RNTI, resume ID, etc.) may be carried in CCCH SDU. The UE ID can be one of a random ID, S-TMSI, C-RNTI, resume ID, international mobile subscriber identity (IMSI), idle mode ID, inactive mode ID, etc. The UE ID can be different in different scenarios in which the UE performs the RA procedure. When the UE performs RA after power on (e.g., before it is attached to the network), then the UE ID is the random ID. When the UE performs RA in an IDLE state after the UE is attached to network, the UE ID is S-TMSI. If the UE has an assigned C-RNTI (e.g., in a connected state), the UE ID is C-RNTI. In case the UE is in an INACTIVE state, the UE ID is a resume ID. In addition to the UE ID, some additional control information can be sent in MSGA. The control information may be included in the MAC PDU of the MSGA. The control information may include one or more of a connection request indication, a connection resume request indication, an SI request indication, a buffer status indication, beam information (e.g., one or more DL TX beam ID(s) or SSB ID(s)), BFR indication/information, a data indicator, a cell/base station (BS)/transmit-receive point (TRP) switching indication, a connection re-establishment indication, a reconfiguration complete or handover complete message, etc.

2-Step CFRA

In this case, the gNB assigns to the UE a dedicated RA preamble(s) and physical uplink shared channel (PUSCH) resource(s) for MSGA transmission. PRACH occasion(s) to be used for preamble transmission may also be indicated. In the first step of 2-step CFRA, the UE transmits the RA preamble on a PRACH and a payload on a PUSCH using the CFRA resources (i.e., a dedicated preamble/PUSCH resource/PRACH occasion). In the second step of 2-step CFRA, after MSGA transmission, the UE monitors for a response from the network (i.e., the gNB) within a configured window. If the UE receives a PDCCH addressed to the C-RNTI, the RA procedure is considered successfully completed. If the UE receives fallback information corresponding to the transmitted preamble, the RA procedure is considered successfully completed.

For certain events such as handover and BFR, if a dedicated preamble(s) and PUSCH resource(s) are assigned to the UE, during the first step of RA procedure, i.e., during RA resource selection for MSGA transmission, the UE determines whether to transmit the dedicated preamble or a non-dedicated preamble. Dedicated preambles are typically provided for a subset of SSBs/CSI-RSs. If there is no SSB/CSI-RS having a DL RSRP above a threshold among the SSBs/CSI-RSs for which CFRA resources (i.e., dedicated preambles/PRACH occasions/PUSCH resources) are provided by the gNB, the UE selects a non-dedicated preamble. Otherwise, the UE selects the dedicated preamble. During the RA procedure, one RA attempt may be 2-step CFRA, while another RA attempt may be 2-step CBRA.

Upon initiation of an RA procedure, the UE first selects the carrier (i.e., an SUL or NUL). If the carrier to use for the RA procedure is explicitly signaled by the gNB, the UE selects the signaled carrier for performing the RA procedure. If the carrier to use for the RA procedure is not explicitly signaled by the gNB; and if the serving cell for the RA procedure is configured with the SUL; and if the RSRP of the DL pathloss reference is less than rsrp-ThresholdSSB-SUL: then the UE selects the SUL carrier for performing RA procedure. Otherwise, the UE selects the NUL carrier for performing the RA procedure. Upon selecting the UL carrier, the UE determines the UL and DL BWP for RA procedure as specified in section 5.15 of technical specification (TS) 38.321. The UE then determines whether to perform 2-step or 4-step RA for this RA procedure.

If this RA procedure is initiated by a PDCCH order and if the ra-PreambleIndex explicitly provided by PDCCH is not 0b000000, the UE selects 4-step RA procedure.

Else if 2-step CFRA resources are signaled by the gNB for this RA procedure, the UE selects 2-step RA procedure.

Else if 4-step CFRA resources are signaled by the gNB for this RA procedure, the UE selects 4-step RA procedure.

Else if the UL BWP selected for this RA procedure is configured with only 2-step RA resources, the UE selects 2-step RA procedure.

Else if the UL BWP selected for this RA procedure is configured with only 4-step RA resources, the UE selects 4-step RA procedure.

Else if the UL BWP selected for this RA procedure is configured with both 2-step and 4-step RA resources and RSRP of the DL pathloss reference is below a configured threshold, the UE selects 4-step RA procedure. Otherwise, the UE selects 2-step RA procedure.

Note that backoff and power ramping is applied for MSGA retransmission as in a legacy RA procedure.

In addition to prioritizing an RA procedure for BFR and handover, recently it has been agreed during the 3G partnership project (3GPP) standardization, to prioritize an RA procedure for multimedia prioritized services (MPS) and mission critical services (MCS). For MPS and MCS, RACH prioritization parameters (RACH prioritization parameter set 1) are introduced in SIB1. RACH prioritization parameters (RACH prioritization parameter set 2) are also signaled in beamFailureRecoveryConfig IE. RACH prioritization parameters (RACH prioritization parameter set 3) are also signaled in rach-ConfigDedicated for handover. rach-ConfigDedicated IE is included in an RRC reconfiguration message including reconfiguration with synchronization.

Currently a user equipment (UE) supporting MPS and MCS always uses RACH prioritization parameter set 1 if configured. However, this is not an efficient approach as it cannot perform prioritization among the MPS/MCS UEs. For a UE supporting MPS and MCS, the UE may not always apply set 1. In such cases, the UE may apply set 1, set 2, or set 3. For the UE supporting MPS and MCS, the criteria to select one of the RACH prioritization parameters from a plurality of RACH prioritization parameters is needed.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide a communication method and system for converging a $5^{th}$ generation (5G) communication system for supporting higher data rates beyond a $4^{th}$ generation (4G) system.

In accordance with an aspect of the disclosure, a method performed by a terminal for random access in a wireless communication system is provided. The method includes receiving at least one of a first set of random access prioritization parameters, a second set of random access prioritization parameters, and a third set of random access prioritization parameters, identifying whether a random access procedure is initiated for beam failure recovery, identifying whether the second set of random access prioritization parameters is received from the base station in case that the random access procedure is initiated for beam failure recovery, identifying whether the first set of random access prioritization parameters is received from the base station in case that the second set of random access prioritization parameters is not received from the base station, and applying the first set of random access prioritization parameters during the random access procedure in case that the first set of random access prioritization parameters is received from the base station.

In accordance with another aspect of the disclosure, a method performed by a terminal for random access in a wireless communication system is provided. The method includes receiving at least one of a first set of random access prioritization parameters, a second set of random access prioritization parameters and a third set of random access prioritization parameters from a base station, identifying whether a random access procedure is initiated for handover, identifying whether the third set of random access prioritization parameters is received from the base station in case that the random access procedure is initiated for handover, identifying whether the first set of random access prioritization parameters is received from the base station in case that the third set of random access prioritization parameters is not received from the base station, and applying the first set of random access prioritization parameters during the random access procedure in case that the first set of random access prioritization parameters is received from the base station.

In accordance with another aspect of the disclosure, a terminal in a wireless communication system is provided. The terminal includes a transceiver and a controller coupled with the transceiver. The controller is configured to receive, from a base station via the transceiver, at least one of a first set of random access prioritization parameters, a second set of random access prioritization parameters and a third set of random access prioritization parameters, identify whether a random access procedure is initiated for beam failure recovery, identify whether the second set of random access prioritization parameters is received from the base station in case that the random access procedure is initiated for beam failure recovery, identify whether the first set of random access prioritization parameters is received from the base station in case that the second set of random access prioritization parameters is not received from the base station, and apply the first set of random access prioritization parameters during the random access procedure in case that the first set of random access prioritization parameters is received from the base station.

In accordance with another aspect of the disclosure, a terminal in a wireless communication system is provided. The terminal includes a transceiver and a controller coupled with the transceiver. The controller is configured to receive, from a base station via the transceiver, at least one of a first set of random access prioritization parameters, a second set of random access prioritization parameters and a third set of random access prioritization parameters, identify whether a random access procedure is initiated for handover, identify whether the third set of random access prioritization parameters is received from the base station in case that the random access procedure is initiated for handover, identify whether the first set of random access prioritization parameters is received from the base station in case that the third set of random access prioritization parameters is not received from the base station, and apply the first set of random access prioritization parameters during the random access procedure in case that the first set of random access prioritization parameters is received from the base station.

Additional aspects will be set forth in part in the description which follows and, in part, will be apparent from the description, or may be learned by practice of the presented embodiments.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
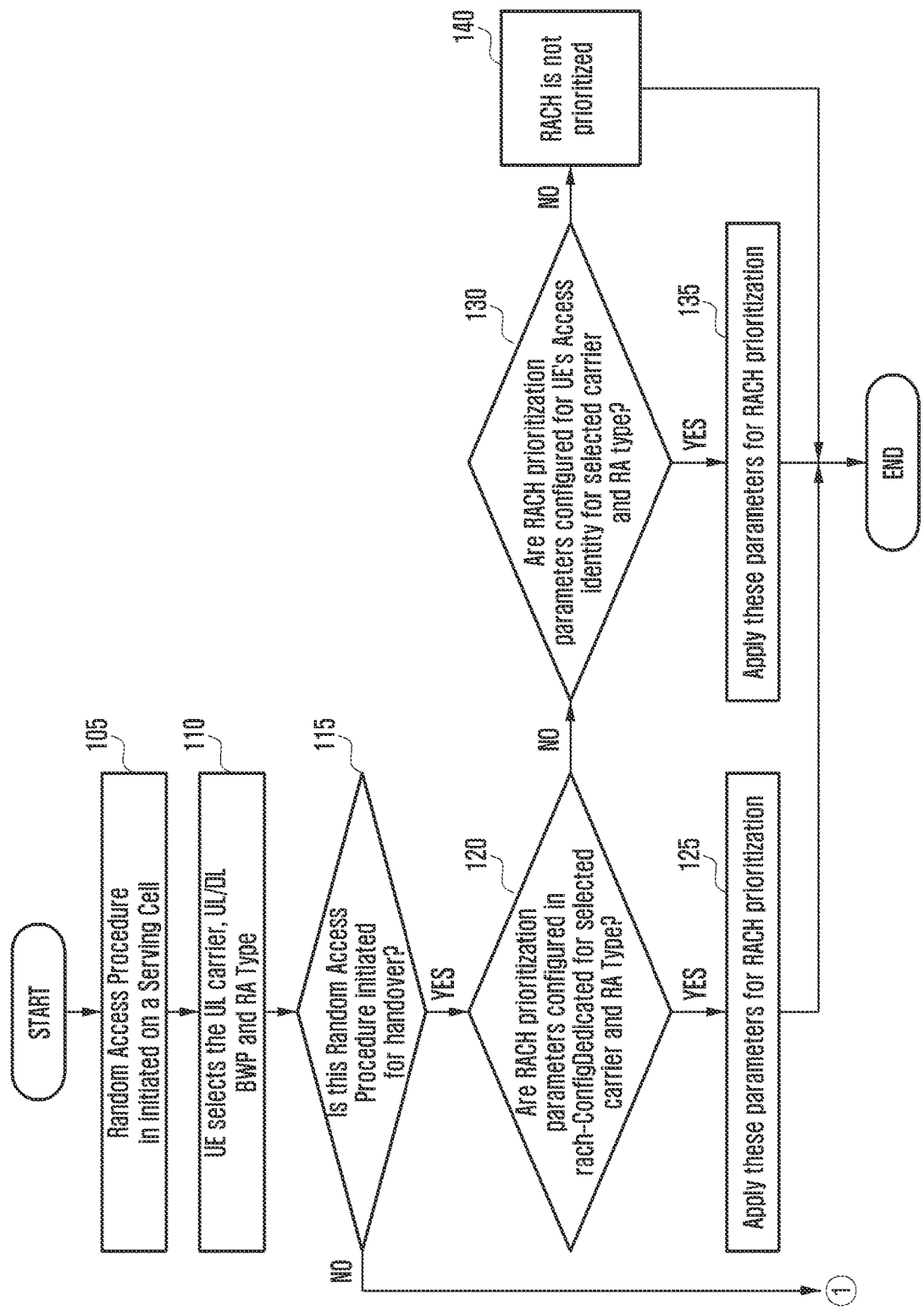
FIGS. 1A and 1B are flowcharts that illustrate an operation for determining random access channel (RACH) parameters to be applied for a random access (RA) procedure according to various embodiments of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect that the characteristic was intended to provide.

It is known to those skilled in the art that blocks of a flowchart (or sequence diagram) and a combination of flowcharts may be represented and executed by non-transitory computer program instructions. These computer program instructions may be loaded on a processor of a general purpose computer, special-purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit," "module," or the like may refer to a software component or hardware component, such as, for example, a field-programmable gate array (FPGA) or an application-specific integrated circuit (ASIC) capable of carrying out a function or an operation. However, a "unit," or the like, is not limited to hardware or software. A unit, or the like, may be configured so as to reside in an addressable storage medium or to drive one or more processors. Units, or the like, may also refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to providing the detailed description, terms or definitions necessary to understand the disclosure are described. However, these terms should be construed in a non-limiting way.

A base station (BS) is an entity communicating with a user equipment (UE) and may be referred to as a BS, a base transceiver station (BTS), a node B (NB), an evolved NB (eNB), an access point (AP), a fifth generation (5G) NB (5GNB), or a next generation NB (gNB).

A UE is an entity communicating with a BS and may be referred to as a UE, a device, a mobile station (MS), a mobile equipment (ME), or a terminal.

Random Access Channel (RACH) Prioritization for Multimedia Prioritized Services (MPS) and Mission Critical Services (MCS)

RACH Prioritization Parameter Set 1

In this case, a UE receives system information block 1 (SIB1) from a gNB. The SIB1 includes initial uplink (UL) bandwidth part (BWP) configuration. The UE receives a radio resource control (RRC) reconfiguration message from the gNB. The RRC reconfiguration message includes initial UL BWP configuration.

Initial UL BWP configuration includes RACH configuration. This RACH configuration for initial UL BWP optionally includes a ra-PrioritizationForAccessIdentity information element (IE). The ra-PrioritizationForAccessIdentity IE includes RACH prioritization parameters (i.e., ra-Prioritization-r16) for MPS and/or MCS. The ra-PrioritizationForAccessIdentity IE also includes ra-PrioritizationForAI which indicates whether the RACH prioritization parameters indicated by ra-Prioritization-r16 can be applied for MPS only or MCS only or can be applied to both. The first/leftmost bit of ra-PrioritizationForAI corresponds to Access Identity 1 (i.e., MPS), and the next bit corresponds to Access Identity 2 (i.e., MCS). Value 1 indicates that the field ra-Prioritization-r16 applies; otherwise, the field does not apply. For example, if first/leftmost bit of ra-PrioritizationForAI is set to 1, then RACH prioritization parameters indicated by ra-Prioritization-r16 applies to MPS; if first/leftmost bit of ra-PrioritizationForAI is set to 0, then RACH prioritization parameters indicated by ra-Prioritization-r16 does not apply to MPS; if next bit of ra-PrioritizationForAI is set to 1, then RACH prioritization parameters indicated by ra-Prioritization-r16 applies to MCS; if next bit of ra-PrioritizationForAI is set to 0, then RACH prioritization parameters indicated by ra-Prioritization-r16 does not apply to MCS. The abstract syntax notation one (ASN.1) structure for ra-PrioritizationForAccessIdentity IE is as follows:

```
ra-PrioritizationForAccessIdentity SEQUENCE {
    ra-Prioritization-r16           RA-Prioritization,
    ra-PrioritizationForAI-r16      BIT STRING (SIZE (2))
}
RA-Prioritization ::=               SEQUENCE {
    powerRampingStepHighPriority    ENUMERATED
                                    {dB0, dB2, dB4, dB6},
    scalingFactorBI                 ENUMERATED
    OPTIONAL, -- Need R             {zero, dot25, dot5, dot75}
    ...
}
```

In an embodiment, RACH prioritization parameters included in the ra-PrioritizationForAccessIdentity IE signaled in initial UL BWP configuration of an UL carrier (i.e., supplementary UL (SUL) or normal UL (NUL)) is applicable for RACH prioritization on any UL BWP of that UL carrier. The advantage of this approach is that the ra-PrioritizationForAccessIdentity IE is not signaled in configuration of every UL BWP, and thus reduces the overhead. In an embodiment, RACH prioritization parameters included in the ra-PrioritizationForAccessIdentity IE is applied only for special cell (SpCell) (i.e., RACH prioritization parameters included in the ra-PrioritizationForAccessIdentity IE signaled in initial UL BWP configuration of an UL carrier (i.e., SUL or NUL) of SpCell is applicable for RACH prioritization on any UL BWP of that UL carrier of SpCell). In an embodiment, RACH prioritization parameters included in the ra-PrioritizationForAccessIdentity IE is applied for any cell of a cell group (i.e., RACH prioritization parameters included in the ra-PrioritizationForAccessIdentity IE signaled in initial UL BWP configuration of an UL carrier (i.e., SUL or NUL) of SpCell is applicable for RACH prioritization on any UL BWP of that UL carrier of any cell of a cell group associated with the SpCell).

In another embodiment, RACH prioritization parameters included in the ra-PrioritizationForAccessIdentity IE signaled in initial UL BWP configuration of an UL carrier (i.e., SUL or NUL) is applicable for RACH prioritization on initial UL BWP of that UL carrier. In this case, the ra-PrioritizationForAccessIdentity IE signaled in UL BWP configuration of a UL BWP of an UL carrier (i.e., SUL or NUL) is applicable for RACH prioritization on that UL BWP of that UL carrier. The advantage of this approach is that the network has flexibility in determining whether to support RACH prioritization for MPS/MCS on an UL BWP. However, this leads to increased signaling overhead. In an embodiment, RACH prioritization parameters included in the ra-PrioritizationForAccessIdentity IE is applied only for the SpCell (i.e., RACH prioritization parameters included in the ra-PrioritizationForAccessIdentity IE signaled in UL BWP configuration of an UL carrier (i.e., SUL or NUL) of the SpCell is applicable for RACH prioritization on that UL BWP of that UL carrier of the SpCell).

In an embodiment, ra-Prioritization parameters can be independently configured for MPS and MCS. ra-PrioritizationForAccessIdentityMPS indicates ra-Prioritization parameters for MPS. ra-PrioritizationForAccessIdentityMCS indicates ra-Prioritization parameters for MCS. The configuration can be provided only in initial UL BWP or can be BWP specific as follows.

```
ra-PrioritizationForAccessIdentityMPS    SEQUENCE {
    ra-Prioritization-r16                RA-Prioritization,
}
ra-PrioritizationForAccessIdentityMCS    SEQUENCE {
    ra-Prioritization-r16                RA-Prioritization,
}
```

RACH Prioritization Parameter Set 2

In this case, a UE receives an RRC reconfiguration message from a gNB. The RRC reconfiguration message includes UL BWP configuration for one or more UL BWPs. UL BWP configuration optionally includes beam failure recovery (BFR) configuration. This BFR configuration optionally includes RACH prioritization parameters (i.e., ra-Prioritization). RACH prioritization parameters in BFR configuration are specific to UL BWP of that configuration. The ASN.1 structure for ra-Prioritization is as follows:

```
ra-Prioritization            RA-Prioritization
RA-Prioritization ::=        SEQUENCE {
    powerRampingStepHighPriority ENUMERATED
                             {dB0, dB2, dB4, dB6},
    scalingFactorBI          ENUMERATED
                             {zero, dot25, dot5, dot75}
OPTIONAL, -- Need R
    ...
}
```

RACH Prioritization Parameter Set 3

In this case, a UE receives an RRC reconfiguration message from a gNB. The RRC reconfiguration message includes ReconfigurationWithSync IE. ReconfigurationWithSync IE includes rach-ConfigDedicated IE. rach-ConfigDedicated IE optionally includes RACH prioritization parameters (i.e., ra-Prioritization) for SUL or NUL. The parameters indicated by rach-ConfigDedicated are applied only for UL BWP indicated by firstActiveUplinkBWP. The ASN.1 structure for ra-Prioritization is as follows:

```
ra-Prioritization            RA-Prioritization
RA-Prioritization ::=        SEQUENCE {
    powerRampingStepHighPriority ENUMERATED
                             {dB0, dB2, dB4, dB6},
    scalingFactorBI          ENUMERATED
OPTIONAL, -- Need R          {zero, dot25, dot5, dot75}
    ...
}
```

Selection of RACH Prioritization Parameters

When the RA procedure is initiated on a serving cell, the MAC entity (i.e., UE) first selects the UL carrier (SUL or NUL) of that serving Cell. If the carrier to use for the RA procedure is explicitly signaled (e.g., in an RRC reconfiguration message) by a gNB, the UE selects the signaled carrier for performing RA procedure. If the carrier to use for the RA procedure is not explicitly signaled; and if the serving cell for the RA procedure is configured with SUL); and if the reference signal received power (RSRP) of the downlink (DL) pathloss reference is less than rsrp-ThresholdSSB-SUL: the UE selects the SUL carrier for performing RA procedure. Otherwise, the UE selects the NUL carrier for performing RA procedure.

The UE then selects the UL and DL BWP for RA procedure on the selected UL carrier of a serving cell on which RA procedure is initiated as follows:

If PRACH occasions are not configured for the active UL BWP, the UE switches the active UL BWP to BWP indicated by initialUplinkBWP; and if the serving cell is a SpCell, the UE switches the active DL BWP to BWP indicated by initialDownlinkBWP.

Else if the serving cell is a SpCell and the active DL BWP does not have the same bwp-Id as the active UL BWP, the UE switches the active DL BWP to the DL BWP with the same bwp-Id as the active UL BWP.

The UE then determines whether to perform 2-step or 4-step RA for this RA procedure.

If this RA procedure is initiated by physical downlink control channel (PDCCH) order and if the ra-PreambleIndex explicitly provided by PDCCH is not 0b000000; or if the RA procedure is initiated for system information (SI) request and the RA resources for SI request have been explicitly provided by RRC; or if the RA procedure is initiated for BFR and if the CFRA resources for BFR request for 4-step RA procedure have been explicitly provided by RRC for the BWP selected for RA procedure; or if the RA procedure is initiated for reconfiguration with synchronization and if the CFRA resources for 4-step RA procedure have been explicitly provided in rach-ConfigDedicated for the BWP selected for RA, the UE selects 4-step RA procedure.

Else if the BWP selected for RA procedure is configured with both 2-step and 4-step RA resources and the RSRP of the DL pathloss reference is above RSRP_THRESHOLD_RA_TYPE_SELECTION (i.e., msgA-RSRP-Threshold-SUL if UL carrier is SUL or msgA-RSRP-Threshold if UL carrier is NUL); or if the BWP selected for RA procedure is only configured with 2-step RA resources (i.e., no 4-step RA resources configured); or if the RA procedure is initiated for reconfiguration with synchronization and if the CFRA resources for 2-step RA have been explicitly provided in rach-ConfigDedicated for the BWP selected for RA: the UE selects 2-step RA procedure.

Else the UE selects 4-step RA procedure.

The UE then determines RACH prioritization parameters to be applied for this RA procedure.

Figure 1B:
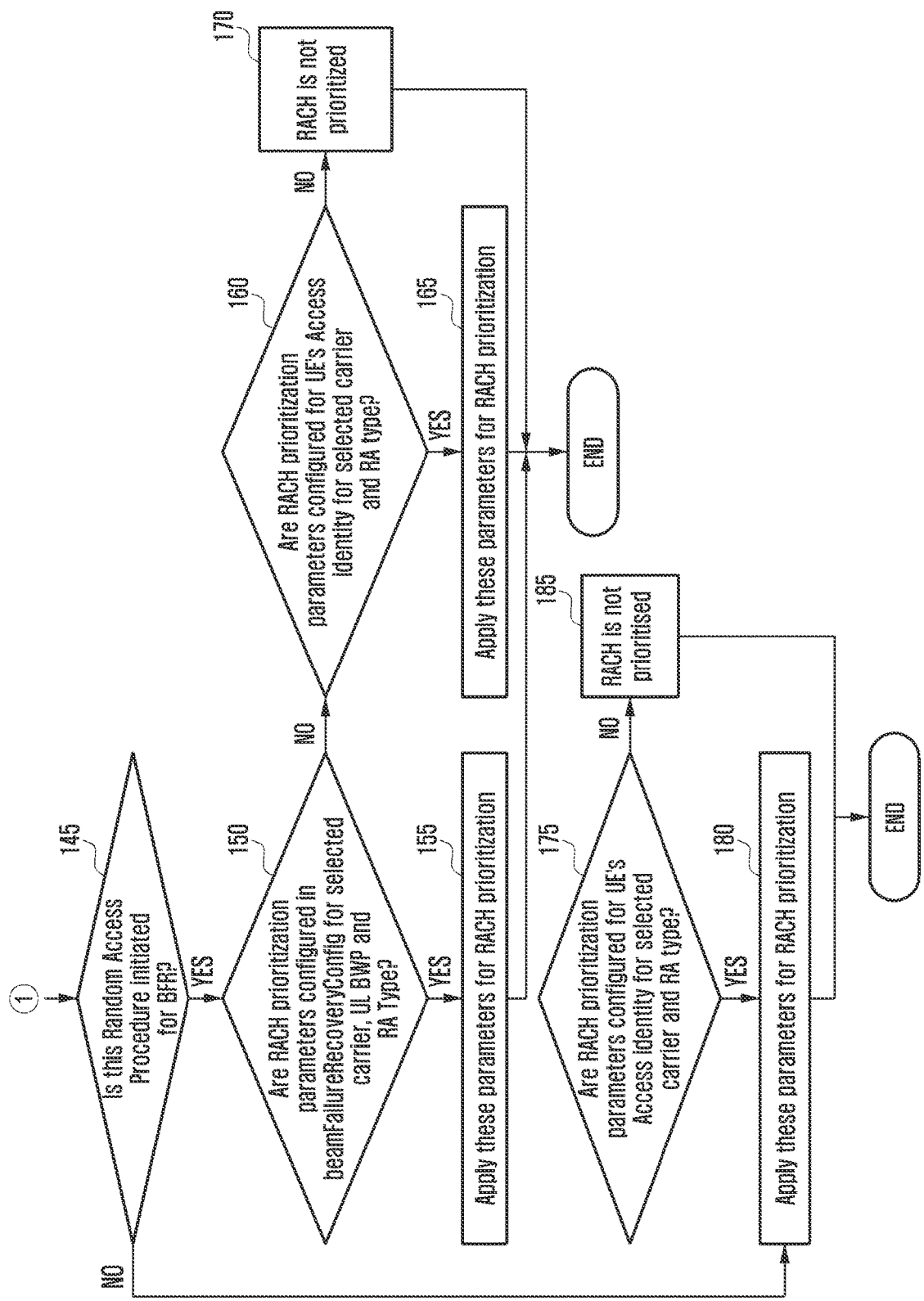

FIGS. 1A and 1B are flowcharts that illustrate an operation for determining RACH prioritization parameters to be applied for an RA procedure according to various embodiments of the disclosure.

Referring to FIG. 1A, if an RA procedure is initiated on a serving cell at operation 105, a UE selects the UL carrier, UL/DL BWP and RA type at operation 110.

If RA type selected is 4-step RA, the UE identifies whether the RA procedure is initiated for handover at operation 115. If this RA procedure is initiated for handover, the UE identifies whether RACH prioritization parameters (i.e., ra-Prioritization) are configured in rach-ConfigDedicated for the selected carrier at operation 120.

If rach-ConfigDedicated is configured for the selected carrier (or for the active UL BWP of selected carrier) and ra-Prioritization is configured in the rach-ConfigDedicated, the UE applies these parameters for RACH prioritization at operation 125. For example, if powerRampingStepHighPriority is configured in the ra-Prioritization in rach-ConfigDedicated, the UE sets PREAMBLE_POWER_RAMPING_STEP to the powerRampingStepHighPriority in the ra-Prioritization in rach-ConfigDedicated; otherwise, (i.e., if powerRampingStepHighPriority is not configured in the ra-Prioritization in rach-ConfigDedicated), the UE sets PREAMBLE_POWER_RAMPING_STEP to the powerRampingStep. If scalingFactorBI is configured in the ra-Prioritization in rach-ConfigDedicated, the UE sets SCALING_FACTOR_BI to the scalingFactorBI in the ra-Prioritization in rach-ConfigDedicated; otherwise, (i.e., if scalingFactorBI is not configured in the ra-Prioritization in rach-ConfigDedicated), the UE sets SCALING_FACTOR_BI to 1.

Else the UE identifies whether the RACH prioritization parameters (i.e., ra-Prioritization) are configured for the UE's access identity (i.e., in ra-PrioritizationForAccessIdentity) for the selected carrier at operation 130. If ra-PrioritizationForAccessIdentity is configured for the selected carrier; and if one or more access identities have been explicitly provided by RRC (i.e., the UE is configured with one or more access identities, and the access identity is provided by non-access stratum (NAS) to RRC); and if for at least one of these access identities, the corresponding bit in the ra-PrioritizationForAI is set to one: the UE applies these parameters for RACH prioritization at operation 135. For example, if powerRampingStepHighPriority is configured in the ra-PrioritizationForAccessIdentity, the UE sets PREAMBLE_POWER_RAMPING_STEP to the powerRampingStepHighPriority; otherwise, (i.e., if powerRampingStepHighPriority is not configured in the ra-PrioritizationForAccessIdentity), the UE sets PREAMBLE_POWER_RAMPING_STEP to the powerRampingStep. If scalingFactorBI is configured in the ra-PrioritizationForAccessIdentity, the UE sets SCALING_FACTOR_BI to the scalingFactorBI; otherwise (i.e., if scalingFactorBI is not configured in the ra-PrioritizationForAccessIdentity), the UE sets SCALING_FACTOR_BI to 1.

Else the RA procedure is not prioritized, i.e., the UE sets PREAMBLE_POWER_RAMPING_STEP to the powerRampingStep and SCALING_FACTOR_BI to 1 at operation 140.

Referring to FIG. 1B, the UE identifies whether the RA procedure is initiated for BFR at operation 145. If the RA procedure is initiated for BFR, the UE identifies whether the RACH prioritization parameters (i.e., ra-Prioritization) are configured in beamFailureRecoveryConfig for the selected carrier and UL BWP at operation 150.

If beamFailureRecoveryConfig is configured for the active UL BWP of the selected carrier and ra-Prioritization is configured in the beamFailureRecoveryConfig, the UE applies these parameters for RACH prioritization at operation 155. For example, if powerRampingStepHighPriority is configured in the ra-Prioritization in beamFailureRecoveryConfig, the UE sets PREAMBLE_POWER_RAMPING_STEP to the powerRampingStepHighPriority in the ra-Prioritization in beamFailureRecoveryConfig; otherwise, the UE sets PREAMBLE_POWER_RAMPING_STEP to the powerRampingStep. If scalingFactorBI is configured in the ra-Prioritization in beamFailureRecoveryConfig, the UE sets SCALING_FACTOR_BI to the scalingFactorBI in the ra-Prioritization in beamFailureRecoveryConfig; otherwise, the UE sets SCALING_FACTOR_BI to 1.

Else the UE identifies whether the RACH prioritization parameters (i.e., ra-Prioritization) are configured for UE's access identity (i.e., in ra-PrioritizationForAccessIdentity) for the selected carrier at operation 160. If ra-PrioritizationForAccessIdentity is configured for the selected carrier; and if one or more access identities have been explicitly provided by RRC (i.e., the UE is configured with one or more access identities, and the access identity is provided by NAS to RRC); and if for at least one of these access identities, the corresponding bit in the ra-PrioritizationForAI is set to one: the UE applies these parameters for RACH prioritization at operation 165. For example, if powerRampingStepHighPriority is configured in the ra-PrioritizationForAccessIdentity, the UE sets PREAMBLE_POWER_RAMPING_STEP to the powerRampingStepHighPriority; otherwise, the UE sets PREAMBLE_POWER_RAMPING_STEP to the powerRampingStep. If scalingFactorBI is configured in the ra-PrioritizationForAccessIdentity, the UE sets SCALING_FACTOR_BI to the scalingFactorBI; otherwise, the UE sets SCALING_FACTOR_BI to 1.

Else the RA procedure is not prioritized, i.e., the UE sets PREAMBLE_POWER_RAMPING_STEP to the powerRampingStep and SCALING_FACTOR_BI to 1 at operation 170.

Else (i.e., the RA procedure is initiated for reason other than handover and BFR) the UE identifies whether the RACH prioritization parameters (i.e., ra-Prioritization) are configured for UE's access identity (i.e., in ra-PrioritizationForAccessIdentity) for the selected carrier at operation 175.

If ra-PrioritizationForAccessIdentity is configured for the selected carrier; and if one or more access identities have been explicitly provided by RRC (i.e., the UE is configured with one or more access identities, and the access identity is provided by NAS to RRC); and if for at least one of these access identities, the corresponding bit in the ra-PrioritizationForAI set to one: the UE applies these parameters for RACH prioritization at operation 180. For example, if powerRampingStepHighPriority is configured in the ra-PrioritizationForAccessIdentity, the UE sets PREAMBLE_POWER_RAMPING_STEP to the powerRampingStepHighPriority; otherwise, the UE sets PREAMBLE_POWER_RAMPING_STEP to the powerRampingStep. If scalingFactorBI is configured in the ra-PrioritizationForAccessIdentity), the UE sets SCALING_FACTOR_BI to the scalingFactorBI; otherwise, the UE sets SCALING_FACTOR_BI to 1.

Else the RA procedure is not prioritized, i.e., the UE sets PREAMBLE_POWER_RAMPING_STEP to the powerRampingStep and SCALING_FACTOR_BI to 1 at operation 185.

Referring again to FIG. 1A, if RA type selected is 2-step RA, the UE identifies whether the RA procedure is initiated for handover at the operation 115. If this RA procedure is initiated for handover, the UE identifies whether RACH prioritization parameters (i.e., ra-PrioritizationTwoStep) are configured in rach-ConfigDedicated for the selected carrier at the operation 120.

If rach-ConfigDedicated is configured for the selected carrier (or for the active UL BWP of selected carrier) and ra-PrioritizationTwoStep is configured in the rach-ConfigDedicated, the UE applies these parameters for RACH prioritization at the operation 125. For example, if powerRampingStepHighPriority is configured in the ra-PrioritizationTwoStep in rach-ConfigDedicated, the UE sets PREAMBLE_POWER_RAMPING_STEP to the powerRampingStepHighPriority in the ra-PrioritizationTwoStep in rach-ConfigDedicated; otherwise, the UE sets PREAMBLE_POWER_RAMPING_STEP to the powerRampingStep. If scalingFactorBI is configured in the ra-PrioritizationTwoStep in rach-ConfigDedicated, the UE sets SCALING_FACTOR_BI to the scalingFactorBI in the ra-PrioritizationTwoStep in rach-ConfigDedicated; otherwise, the UE sets SCALING_FACTOR_BI to 1.

Else the UE identifies whether the RACH prioritization parameters (i.e., ra-Prioritization) are configured for UE's access identity (i.e., in ra-PrioritizationForAccessIdentityTwoStep) for the selected carrier at the operation 130. If ra-PrioritizationForAccessIdentityTwoStep is configured for the selected carrier; and if one or more access identities have been explicitly provided by RRC (i.e., the UE is configured with one or more access identities, and the access identity is provided by NAS to RRC); and if for at least one of these access identities the corresponding bit in the ra-PrioritizationForAI is set to one: the UE applies these parameters for RACH prioritization at the operation 135. For example, if powerRampingStepHighPriority is configured in the ra-PrioritizationForAccessIdentityTwoStep, the UE sets PREAMBLE_POWER_RAMPING_STEP to the powerRampingStepHighPriority; otherwise, the UE sets PREAMBLE_POWER_RAMPING_STEP to the powerRampingStep. If scalingFactorBI is configured in the ra-PrioritizationForAccessIdentityTwoStep, the UE sets SCALING_FACTOR_BI to the scalingFactorBI; otherwise, the UE sets SCALING_FACTOR_BI to 1.

Else the RA procedure is not prioritized, i.e., the UE sets PREAMBLE_POWER_RAMPING_STEP to the powerRampingStep and SCALING_FACTOR_BI to 1 at the operation 140.

Referring again to FIG. 1B, the UE identifies whether the RA procedure is initiated for BFR at the operation 145. If RA procedure is initiated for BFR, the UE identifies whether the RACH prioritization parameters (i.e., ra-PrioritizationTwoStep) are configured in beamFailureRecoveryConfig for the selected carrier and UL BWP at the operation 150.

If beamFailureRecoveryConfig is configured for the active UL BWP of the selected carrier and ra-PrioritizationTwoStep is configured in the beamFailureRecoveryConfig, the UE applies these parameters for RACH prioritization at the operation 155. For example, if powerRampingStepHighPriority is configured in the ra-PrioritizationTwoStep in beamFailureRecoveryConfig, the UE sets PREAMBLE_POWER_RAMPING_STEP to the powerRampingStepHighPriority in the ra-PrioritizationTwoStep in beamFailureRecoveryConfig; otherwise, the UE sets PREAMBLE_POWER_RAMPING_STEP to the powerRampingStep. If scalingFactorBI is configured in the ra-PrioritizationTwoStep in beamFailureRecoveryConfig, the UE sets SCALING_FACTOR_BI to the scalingFactorBI in the ra-PrioritizationTwoStep in beamFailureRecoveryConfig; otherwise, the UE sets SCALING_FACTOR_BI to 1.

Else the UE identifies whether the RACH prioritization parameters (i.e., ra-Prioritization) are configured for UE's access identity (i.e., in ra-PrioritizationForAccessIdentityTwoStep) for the selected carrier at the operation 160. If ra-PrioritizationForAccessIdentityTwoStep is configured for the selected carrier; and if one or more access identities have been explicitly provided by RRC (i.e., the UE is configured with one or more access identities, and the access identity is provided by NAS to RRC); and if for at least one of these access identities, the corresponding bit in the ra-PrioritizationForAI is set to one: the UE applies these parameters for RACH prioritization at the operation 165. For example, if powerRampingStepHighPriority is configured in the ra-PrioritizationForAccessIdentityTwoStep, the UE sets PREAMBLE_POWER_RAMPING_STEP to the powerRampingStepHighPriority; otherwise, the UE sets PREAMBLE_POWER_RAMPING_STEP to the powerRampingStep. If scalingFactorBI is configured in the ra-PrioritizationForAccessIdentityTwoStep, the UE sets SCALING_FACTOR_BI to the scalingFactorBI; otherwise, the UE sets SCALING_FACTOR_BI to 1.

Else the RA procedure is not prioritized, i.e., the UE sets PREAMBLE_POWER_RAMPING_STEP to the powerRampingStep and SCALING_FACTOR_BI to 1 at the operation 170.

Else (i.e., the RA procedure is initiated for reason other than handover and BFR) the UE identifies whether the RACH prioritization parameters (i.e., ra-Prioritization) are configured for the UE's access identity (i.e., in ra-PrioritizationForAccessIdentityTwoStep) for the selected carrier at the operation 175. If ra-PrioritizationForAccessIdentityTwoStep is configured for the selected carrier; and if one or more access identities have been explicitly provided by RRC (i.e., the UE is configured with one or more access identities, and the access identity is provided by NAS to RRC); and if for at least one of these access identities, the corresponding bit in the ra-PrioritizationForAI is set to one: the UE applies these parameters for RACH prioritization at the operation 180. For example, if powerRampingStepHighPriority is configured in the ra-PrioritizationForAccessIdentityTwoStep, the UE sets PREAMBLE_POWER_RAMPING_STEP to the powerRampingStepHighPriority; otherwise, the UE sets PREAMBLE_POWER_RAMPING_STEP to the powerRampingStep. If scalingFactorBI is configured in the ra-PrioritizationForAccessIdentityTwoStep, the UE sets SCALING_FACTOR_BI to the scalingFactorBI; otherwise, the UE sets SCALING_FACTOR_BI to 1.

Else the RA procedure is not prioritized, i.e., the UE sets PREAMBLE_POWER_RAMPING_STEP to the powerRampingStep and SCALING_FACTOR_BI to 1 at the operation 185.

The UE may determine RACH prioritization parameters to be applied for the RA procedure based on another embodiment of the disclosure.

If RA type selected is 4-step RA, the UE identifies whether the RA procedure is initiated for handover. If this RA procedure is initiated for handover, the UE identifies whether RACH prioritization parameters (i.e., ra-Prioritization) are configured in rach-ConfigDedicated for the selected carrier.

If rach-ConfigDedicated is configured for the selected carrier and ra-Prioritization is configured in the rach-ConfigDedicated, the UE applies these parameters for RACH prioritization. For example, if powerRampingStepHighPriority is configured in the ra-Prioritization in the rach-ConfigDedicated, the UE sets PREAMBLE_POWER_RAMPING_STEP to the powerRampingStepHighPriority in the ra-Prioritization in the rach-ConfigDedicated; otherwise (i.e., if powerRampingStepHighPriority is not configured in the ra-Prioritization in the rach-ConfigDedicated), the UE sets PREAMBLE_POWER_RAMPING_STEP to the powerRampingStep. If scalingFactorBI is configured in the ra-Prioritization in the rach-ConfigDedicated, the UE sets SCALING_FACTOR_BI to the scalingFactorBI in the ra-Prioritization in the rach-ConfigDedicated; otherwise (i.e., if scalingFactorBI is not configured in the ra-Prioritization in the rach-ConfigDedicated), the UE sets SCALING_FACTOR_BI to 1.

Else if ra-PrioritizationForAccessIdentity is configured for the active UL BWP of the selected carrier; and if one or more access identities have been explicitly provided by RRC (i.e., the UE is configured with one or more access identities, and the access identity is provided by NAS to RRC); and if for at least one of these access identities, the corresponding bit in the ra-PrioritizationForAI is set to one: the UE applies these parameters for RACH prioritization. For example, if powerRampingStepHighPriority is configured in the ra-PrioritizationForAccessIdentity, the UE sets PREAMBLE_POWER_RAMPING_STEP to the powerRampingStepHighPriority; otherwise (i.e., if powerRampingStepHighPriority is not configured in the ra-PrioritizationForAccessIdentity), the UE sets PREAMBLE_POWER_RAMPING_STEP to the powerRampingStep. If scalingFactorBI is configured in the ra-PrioritizationForAccessIdentity, the UE sets SCALING_FACTOR_BI to the scalingFactorBI; otherwise (i.e., if scalingFactorBI is not configured in the ra-PrioritizationForAccessIdentity), the UE sets SCALING_FACTOR_BI to 1.

Else the UE sets PREAMBLE_POWER_RAMPING_STEP to the powerRampingStep and SCALING_FACTOR_BI to 1.

Else if RA procedure is initiated for BFR, the UE identifies whether the RACH prioritization parameters (i.e., ra-Prioritization) are configured in beamFailureRecoveryConfig for the active UL BWP of the selected carrier and UL BWP.

If beamFailureRecoveryConfig is configured for the active UL BWP of the selected carrier and ra-Prioritization is configured in the beamFailureRecoveryConfig, the UE applies these parameters for RACH prioritization. For example, if powerRampingStepHighPriority is configured in the ra-Prioritization in the beamFailureRecoveryConfig, the UE sets PREAMBLE_POWER_RAMPING_STEP to the powerRampingStepHighPriority in the ra-Prioritization in the beamFailureRecoveryConfig; otherwise (i.e., if powerRampingStepHighPriority is not configured in the ra-Prioritization in the beamFailureRecoveryConfig), the UE sets PREAMBLE_POWER_RAMPING_STEP to the powerRampingStep. If scalingFactorBI is configured in the ra-Prioritization in the beamFailureRecoveryConfig, the UE sets SCALING_FACTOR_BI to the scalingFactorBI in the ra-Prioritization in the beamFailureRecoveryConfig; otherwise (i.e., if scalingFactorBI is not configured in the ra-Prioritization in the beamFailureRecoveryConfig), the UE sets SCALING_FACTOR_BI to 1.

Else if ra-PrioritizationForAccessIdentity is configured for the active UL BWP of the selected carrier; and if one or more access identities have been explicitly provided by RRC (i.e., the UE is configured with one or more access identities, and the UE access identity is provided by NAS to RRC); and if for at least one of these access identities, the corresponding bit in the ra-PrioritizationForAI is set to one: the UE applies these parameters for RACH prioritization. For example, if powerRampingStepHighPriority is configured in the ra-PrioritizationForAccessIdentity, the UE sets PREAMBLE_POWER_RAMPING_STEP to the powerRampingStepHighPriority; otherwise (i.e., if powerRampingStepHighPriority is not configured in the ra-PrioritizationForAccessIdentity), the UE sets PREAMBLE_POWER_RAMPING_STEP to the powerRampingStep. If scalingFactorBI is configured in the ra-PrioritizationForAccessIdentity, the UE sets SCALING_FACTOR_BI to the scalingFactorBI; otherwise (i.e., if scalingFactorBI is not configured in the ra-PrioritizationForAccessIdentity), the UE sets SCALING_FACTOR_BI to 1.

Else the UE sets PREAMBLE_POWER_RAMPING_STEP to the powerRampingStep and SCALING_FACTOR_BI to 1.

Else (i.e., RA procedure is initiated for reason other than handover and BFR) if ra-PrioritizationForAccessIdentity is configured for the active UL BWP of the selected carrier; and if one or more access identities have been explicitly provided by RRC (i.e., the UE is configured with one or more access identities, and the access identity is provided by NAS to RRC); and if for at least one of these access identities, the corresponding bit in the ra-PrioritizationForAI is set to one: the UE applies these parameters for RACH prioritization. For example, if powerRampingStepHighPriority is configured in the ra-PrioritizationForAccessIdentity, the UE sets PREAMBLE_POWER_RAMPING_STEP to the powerRampingStepHighPriority; otherwise (i.e., if powerRampingStepHighPriority is not configured in the ra-PrioritizationForAccessIdentity), the UE sets PREAMBLE_POWER_RAMPING_STEP to the powerRampingStep. If scalingFactorBI is configured in the ra-PrioritizationForAccessIdentity, the UE sets SCALING_FACTOR_BI to the scalingFactorBI; otherwise (i.e., if scalingFactorBI is not configured in the ra-PrioritizationForAccessIdentity), the UE sets SCALING_FACTOR_BI to 1.

Else the UE sets PREAMBLE_POWER_RAMPING_STEP to the powerRampingStep and SCALING_FACTOR_BI to 1.

If RA type selected is 2-step RA, the UE identifies whether the RA procedure is initiated for handover. If this RA procedure is initiated for handover, the UE identifies whether RACH prioritization parameters (i.e., ra-PrioritizationTwoStep) are configured in rach-ConfigDedicated for the selected carrier.

If rach-ConfigDedicated is configured for the selected carrier and ra-PrioritizationTwoStep is configured in the rach-ConfigDedicated, the UE applies these parameters for RACH prioritization. For example, if powerRampingStepHighPriority is configured in the ra-PrioritizationTwoStep in the rach-ConfigDedicated, the UE sets PREAMBLE_POWER_RAMPING_STEP to the powerRampingStepHighPriority in the ra-PrioritizationTwoStep in the rach-ConfigDedicated; otherwise, the UE sets PREAMBLE_POWER_RAMPING_STEP to the powerRampingStep. If scalingFactorBI is configured in the ra-PrioritizationTwoStep in the rach-ConfigDedicated, the UE sets SCALING_FACTOR_BI to the scalingFactorBI in the ra-PrioritizationTwoStep in the rach-ConfigDedicated; otherwise, the UE sets SCALING_FACTOR_BI to 1.

Else if ra-PrioritizationForAccessIdentityTwoStep is configured for the active UL BWP of the selected carrier; and if one or more access identities have been explicitly provided by RRC (i.e., the UE is configured with one or more access identities, and the access identity is provided by NAS to RRC); and if for at least one of these access identities, the corresponding bit in the ra-PrioritizationForAI is set to one: the UE applies these parameters for RACH prioritization. For example, if powerRampingStepHighPriority is configured in the ra-PrioritizationForAccessIdentityTwoStep, the UE sets PREAMBLE_POWER_RAMPING_STEP to the powerRampingStepHighPriority; otherwise, the UE sets PREAMBLE_POWER_RAMPING_STEP to the powerRampingStep. If scalingFactorBI is configured in the ra-PrioritizationForAccessIdentityTwoStep, the UE sets SCALING_FACTOR_BI to the scalingFactorBI; otherwise, the UE sets SCALING_FACTOR_BI to 1.

Else the UE sets PREAMBLE_POWER_RAMPING_STEP to the powerRampingStep and SCALING_FACTOR_BI to 1.

Else if RA procedure is initiated for BFR, the UE identifies whether the RACH prioritization parameters (i.e., ra-Prioritization) are configured in beamFailureRecoveryConfig for the active UL BWP of the selected carrier and UL BWP.

If beamFailureRecoveryConfig is configured for the active UL BWP of the selected carrier and ra-PrioritizationTwoStep is configured in the beamFailureRecoveryConfig, the UE applies these parameters for RACH prioritization. For example, if powerRampingStepHighPriority is configured in the ra-PrioritizationTwoStep in the beamFailureRecoveryConfig, the UE sets PREAMBLE_POWER_RAMPING_STEP to the powerRampingStepHighPriority in the ra-PrioritizationTwoStep in the beamFailureRecoveryConfig; otherwise, the UE sets PREAMBLE_POWER_RAMPING_STEP to the powerRampingStep. If scalingFactorBI is configured in the ra-PrioritizationTwoStep in the beamFailureRecoveryConfig, the UE sets SCALING_FACTOR_BI to the scalingFactorBI in the ra-PrioritizationTwoStep in the beamFailureRecoveryConfig; otherwise, the UE sets SCALING_FACTOR_BI to 1.

Else if ra-PrioritizationForAccessIdentityTwoStep is configured for the active UL BWP of the selected carrier; and if one or more access identities have been explicitly provided by RRC (i.e., the UE is configured with one or more access identities, and the UE access identity is provided by NAS to RRC); and if for at least one of these access identities, the corresponding bit in the ra-PrioritizationForAI is set to one: the UE applies these parameters for RACH prioritization. For example, if powerRampingStepHighPriority is configured in the ra-PrioritizationForAccessIdentityTwoStep, the UE sets PREAMBLE_POWER_RAMPING_STEP to the powerRampingStepHighPriority; otherwise, the UE sets PREAMBLE_POWER_RAMPING_STEP to the powerRampingStep. If scalingFactorBI is configured in the ra-PrioritizationForAccessIdentityTwoStep, the UE sets SCALING_FACTOR_BI to the scalingFactorBI; otherwise, the UE sets SCALING_FACTOR_BI to 1.

Else the UE sets PREAMBLE_POWER_RAMPING_STEP to the powerRampingStep and SCALING_FACTOR_BI to 1.

Else (i.e., RA procedure is initiated for reason other than handover and BFR) if ra-PrioritizationForAccessIdentity is configured for the active UL BWP of the selected carrier; and if one or more access identities have been explicitly provided by RRC (i.e., the UE is configured with one or more access identities, and the access identity is provided by NAS to RRC); and if for at least one of these access identities, the corresponding bit in the ra-PrioritizationForAI is set to one: the UE applies these parameters for RACH prioritization. For example, if powerRampingStepHighPriority is configured in the ra-PrioritizationForAccessIdentity, the UE sets PREAMBLE_POWER_RAMPING_STEP to the powerRampingStepHighPriority; otherwise, the UE sets PREAMBLE_POWER_RAMPING_STEP to the powerRampingStep. If scalingFactorBI is configured in the ra-PrioritizationForAccessIdentity, the UE sets SCALING_FACTOR_BI to the scalingFactorBI; otherwise, the UE sets SCALING_FACTOR_BI to 1.

Else the UE sets PREAMBLE_POWER_RAMPING_STEP to the powerRampingStep and SCALING_FACTOR_BI to 1.

The UE may determine RACH prioritization parameters to be applied for the RA procedure based on another embodiment of the disclosure.

If RA type selected is 4-step RA, the UE sets PREAMBLE_POWER_RAMPING_STEP to powerRampingStep and SCALING_FACTOR_BI to 1.

If ra-PrioritizationForAccessIdentity is configured for the selected carrier; and if one or more access identities have been explicitly provided by RRC (i.e., the UE is configured with one or more access identities, and the access identity is provided by NAS to RRC); and if for at least one of these access identities, the corresponding bit in the ra-PrioritizationForAI is set to one: the UE applies these parameters for RACH prioritization. For example, if powerRampingStepHighPriority is configured in the ra-PrioritizationForAccessIdentity, the UE sets PREAMBLE_POWER_RAMPING_STEP to the powerRampingStepHighPriority. If scalingFactorBI is configured in the ra-PrioritizationForAccessIdentity, the UE sets SCALING_FACTOR_BI to the scalingFactorBI.

If this RA is initiated for handover; and if rach-ConfigDedicated is configured for the selected carrier; and if ra-Prioritization is configured in the rach-ConfigDedicated: the UE applies these parameters for RACH prioritization. For example, if powerRampingStepHighPriority is configured in the ra-Prioritization in the rach-ConfigDedicated, the UE sets PREAMBLE_POWER_RAMPING_STEP to the powerRampingStepHighPriority in the ra-Prioritization in the rach-ConfigDedicated. If scalingFactorBI is configured in the ra-Prioritization in the rach-ConfigDedicated, the UE sets SCALING_FACTOR_BI to the scalingFactorBI in the ra-Prioritization in the rach-ConfigDedicated.

Else if the RA procedure is initiated for BFR; and if beamFailureRecoveryConfig is configured for the active UL BWP of the selected carrier; and if ra-Prioritization is configured in the beamFailureRecoveryConfig: the UE applies these parameters for RACH prioritization. For example, if powerRampingStepHighPriority is configured in the ra-Prioritization in the beamFailureRecoveryConfig, the UE sets PREAMBLE_POWER_RAMPING_STEP to the powerRampingStepHighPriority in the ra-Prioritization in the beamFailureRecoveryConfig. If scalingFactorBI is configured in the ra-Prioritization in the beamFailureRecoveryConfig, the UE sets SCALING_FACTOR_BI to the scalingFactorBI in the ra-Prioritization in the beamFailureRecoveryConfig.

If RA type selected is 2-step RA, the UE sets PREAMBLE_POWER_RAMPING_STEP to powerRampingStep and SCALING_FACTOR_BI to 1.

If ra-PrioritizationForAccessIdentityTwoStep is configured for the selected carrier; and if one or more access identities have been explicitly provided by RRC (i.e., the UE is configured with one or more access identities, and the access identity is provided by NAS to RRC); and if for at least one of these access identities, the corresponding bit in the ra-PrioritizationForAI is set to one: the UE applies these parameters for RACH prioritization. For example, if powerRampingStepHighPriority is configured in the ra-PrioritizationForAccessIdentityTwoStep, the UE sets PREAMBLE_POWER_RAMPING_STEP to the powerRampingStepHighPriority. If scalingFactorBI is configured in the ra-PrioritizationForAccessIdentityTwoStep, the UE sets SCALING_FACTOR_BI to the scalingFactorBI.

If this RA is initiated for handover; and if rach-ConfigDedicated is configured for the selected carrier; and if ra-PrioritizationTwoStep is configured in the rach-ConfigDedicated: the UE applies these parameters for RACH prioritization. For example, if powerRampingStepHighPriority is configured in the ra-PrioritizationTwoStep in the rach-ConfigDedicated, the UE sets PREAMBLE_POWER_RAMPING_STEP to the powerRampingStepHighPriority in the ra-PrioritizationTwoStep in the rach-ConfigDedicated. If scalingFactorBI is configured in the ra-PrioritizationTwoStep in the rach-ConfigDedicated, the UE sets SCALING_FACTOR_BI to the scalingFactorBI in the ra-PrioritizationTwoStep in the rach-ConfigDedicated.

Else if the RA procedure is initiated for BFR; and if beamFailureRecoveryConfig is configured for the active UL BWP of the selected carrier; and if ra-PrioritizationTwoStep is configured in the beamFailureRecoveryConfig: the UE applies these parameters for RACH prioritization. For example, if powerRampingStepHighPriority is configured in the ra-PrioritizationTwoStep in the beamFailureRecoveryConfig, the UE sets PREAMBLE_POWER_RAMPING_STEP to the powerRampingStepHighPriority in the ra-PrioritizationTwoStep in the beamFailureRecoveryConfig. If scalingFactorBI is configured in the ra-PrioritizationTwoStep in the beamFailureRecoveryConfig, the UE sets SCALING_FACTOR_BI to the scalingFactorBI in the ra-PrioritizationTwoStep in the beamFailureRecoveryConfig.

The UE may determine RACH prioritization parameters to be applied for the RA procedure based on another embodiment of the disclosure.

If RA type selected is 4-step RA, the UE sets PREAMBLE_POWER_RAMPING_STEP to powerRampingStep and SCALING_FACTOR_BI to 1.

If ra-PrioritizationForAccessIdentity is configured for the active UL BWP of selected carrier; and if one or more access identities have been explicitly provided by RRC (i.e., the UE is configured with one or more access identities, and the access identity is provided by NAS to RRC); and if for at least one of these access identities, the corresponding bit in the ra-PrioritizationForAI is set to one: the UE applies these parameters for RACH prioritization. For example, if powerRampingStepHighPriority is configured in the ra-PrioritizationForAccessIdentity, the UE sets PREAMBLE_POWER_RAMPING_STEP to the powerRampingStepHighPriority. If scalingFactorBI is configured in the ra-PrioritizationForAccessIdentity, the UE sets SCALING_FACTOR_BI to the scalingFactorBI.

If this RA procedure is initiated for handover; and if rach-ConfigDedicated is configured for the selected carrier; and if ra-Prioritization is configured in the rach-ConfigDedicated: the UE applies these parameters for RACH prioritization. For example, if powerRampingStepHighPriority is configured in the ra-Prioritization in the rach-ConfigDedicated, the UE sets PREAMBLE_POWER_RAMPING_STEP to the powerRampingStepHighPriority in the ra-Prioritization in the rach-ConfigDedicated. If scalingFactorBI is configured in the ra-Prioritization in the rach-ConfigDedicated, the UE sets SCALING_FACTOR_BI to the scalingFactorBI in the ra-Prioritization in the rach-ConfigDedicated.

Else if the RA procedure is initiated for BFR; and if beamFailureRecoveryConfig is configured for the active UL BWP of the selected carrier; and if ra-Prioritization is configured in the beamFailureRecoveryConfig: the UE applies these parameters for RACH prioritization. For example, if powerRampingStepHighPriority is configured in the ra-Prioritization in the beamFailureRecoveryConfig, the UE sets PREAMBLE_POWER_RAMPING_STEP to the powerRampingStepHighPriority in the ra-Prioritization in the beamFailureRecoveryConfig. If scalingFactorBI is configured in the ra-Prioritization in the beamFailureRecoveryConfig, the UE sets SCALING_FACTOR_BI to the scalingFactorBI in the ra-Prioritization in the beamFailureRecoveryConfig.

If RA type selected is 2-step RA, the UE sets PREAMBLE_POWER_RAMPING_STEP to powerRampingStep and SCALING_FACTOR_BI to 1.

If ra-PrioritizationForAccessIdentityTwoStep is configured for the active UL BWP of the selected carrier; and if one or more access identities have been explicitly provided by RRC (i.e., the UE is configured with one or more access identities, and the access identity is provided by NAS to RRC); and if for at least one of these access identities, the corresponding bit in the ra-PrioritizationForAI is set to one: the UE applies these parameters for RACH prioritization. For example, if powerRampingStepHighPriority is configured in the ra-PrioritizationForAccessIdentityTwoStep, the UE sets PREAMBLE_POWER_RAMPING_STEP to the powerRampingStepHighPriority. If scalingFactorBI is configured in the ra-PrioritizationForAccessIdentityTwoStep, the UE sets SCALING_FACTOR_BI to the scalingFactorBI.

If this RA procedure is initiated for handover; and if rach-ConfigDedicated is configured for the selected carrier; and if ra-PrioritizationTwoStep is configured in the rach-ConfigDedicated: the UE applies these parameters for RACH prioritization. For example, if powerRampingStepHighPriority is configured in the ra-PrioritizationTwoStep in the rach-ConfigDedicated, the UE sets PREAMBLE_POWER_RAMPING_STEP to the powerRampingStepHighPriority in the ra-PrioritizationTwoStep in the rach-ConfigDedicated. If scalingFactorBI is configured in the ra-PrioritizationTwoStep in the rach-ConfigDedicated, the UE sets SCALING_FACTOR_BI to the scalingFactorBI in the ra-PrioritizationTwoStep in the rach-ConfigDedicated.

Else if the RA procedure is initiated for BFR; and if beamFailureRecoveryConfig is configured for the active UL BWP of the selected carrier; and if ra-PrioritizationTwoStep is configured in the beamFailureRecoveryConfig: the UE applies these parameters for RACH prioritization. For example, if powerRampingStepHighPriority is configured in the ra-PrioritizationTwoStep in the beamFailureRecoveryConfig, the UE sets PREAMBLE_POWER_RAMPING_STEP to the powerRampingStepHighPriority in the ra-PrioritizationTwoStep in the beamFailureRecoveryConfig. If scalingFactorBI is configured in the ra-PrioritizationTwoStep in the beamFailureRecoveryConfig, the UE sets SCALING_FACTOR_BI to the scalingFactorBI in the ra-PrioritizationTwoStep in the beamFailureRecoveryConfig.

The UE then selects RA resources according to selected RA type and transmits an RA preamble in case of 4-step RA or a MSGA (i.e., an RA preamble and a MSGA payload) in case of 2-step RA.

If an RA attempt is not successful, before the next RA attempt based on CBRA, the UE performs backoff if a backoff index is received in an RAR/MSGB after transmitting the RA preamble/MSGA during the RA attempt of 4-step RA or 2-step RA respectively. The UE retransmits an RA preamble/MSGA after a time period which is randomly selected between 0 and SCALING_FACTOR_BI*backoff value, where SCALING_FACTOR_BI is determined as described above. The backoff value corresponding to the backoff index received in the RAR is obtained by the UE from a pre-defined backoff table.

If an RA attempt is not successful, during the next RA attempt, the UE uses PREAMBLE_POWER_RAMPING_STEP for power ramping (as in section 5.1.3 and 5.1.3a of technical specification (TS) 38.321) where PREAMBLE_POWER_RAMPING_STEP is determined as described above.

Handover and Usage of Various RACH Prioritization Parameters

The UE receives from a source SpCell an RRCReconfiguration message including ReconfigWithSync IE.

A first RACH prioritization parameter set is included in rach-ConfigDedicated IE of the received RRCReconfiguration message. The rach-ConfigDedicated IE includes RACH prioritization parameters (i.e., ra-Prioritization) for SUL or NUL. The parameters indicated by rach-ConfigDedicated are applied only for UL BWP indicated by firstActiveUplinkBWP. The ASN.1 structure for ra-Prioritization is as follows:

```
ra-Prioritization          RA-Prioritization
RA-Prioritization ::=      SEQUENCE {
    powerRampingStepHighPriority ENUMERATED
                               {dB0, dB2, dB4, dB6},
    scalingFactorBI            ENUMERATED
                               {zero, dot25, dot5, dot75}
    OPTIONAL, -- Need R
    ...
}
```

A second RACH prioritization parameter set is included in beamFailureRecoveryConfig IE in the received RRCReconfiguration message. The received RRC reconfiguration message includes UL BWP configuration for one or more UL BWPs. UL BWP configuration includes BFR configuration (i.e., beamFailureRecoveryConfig IE). This BFR configuration includes RACH prioritization parameters (i.e., ra-Prioritization). RACH prioritization parameters in BFR configuration are specific to UL BWP of that configuration. The ASN.1 structure for ra-Prioritization is as follows:

```
ra-Prioritization          RA-Prioritization
RA-Prioritization ::=      SEQUENCE {
   powerRampingStepHighPriority ENUMERATED
                              {dB0, dB2, dB4, dB6},
   scalingFactorBI            ENUMERATED
                              {zero, dot25, dot5, dot75}
OPTIONAL, -- Need R
   ...
}
```

The UE initiates RA procedure and performs the RA procedure toward the target SpCell. During the RA procedure, the UE applies first RACH prioritization parameter set for RACH prioritization. For example, if powerRampingStepHighPriority is configured in the rach-ConfigDedicated, the UE sets PREAMBLE_POWER_RAMPING_STEP to the powerRampingStepHighPriority in the rach-ConfigDedicated. If scalingFactorBI is configured in the rach-ConfigDedicated, the UE sets SCALING_FACTOR_BI to the scalingFactorBI in the rach-ConfigDedicated.

The UE receives SIB1 in the target cell and acquires a third RACH prioritization parameter set in ra-PrioritizationForAccessIdentity. Alternately, the UE may receive SIB1 in the received RRCReconfiguration message from the source cell or the UE may receive the third RACH prioritization parameter set in the received RRCReconfiguration message from the source cell. The third RACH prioritization parameter set is configured using ra-PrioritizationForAccessIdentity IE. ra-PrioritizationForAccessIdentity IE includes RACH prioritization parameters (i.e., ra-Prioritization-r16) for MPS and/or MCS. ra-PrioritizationForAccessIdentity IE also includes ra-PrioritizationForAI which indicates whether the RACH prioritization parameters indicated by ra-Prioritization-r16 can be applied for MPS only or MCS only or can be applied to both. The first/leftmost bit of ra-PrioritizationForAI corresponds to Access Identity 1 (i.e., MPS), and the next bit corresponds to Access Identity 2 (i.e., MCS). Value 1 indicates that the field ra-Prioritization-r16 applies, otherwise, the field does not apply. For example, if the first/leftmost bit of ra-PrioritizationForAI is set to 1, then RACH prioritization parameters indicated by ra-Prioritization-r16 applies to MPS; if the first/leftmost bit of ra-PrioritizationForAI is set to 0, then RACH prioritization parameters indicated by ra-Prioritization-r16 do not apply to MPS; if the next bit of ra-PrioritizationForAI is set to 1, then RACH prioritization parameters indicated by ra-Prioritization-r16 applies to MCS; if the next bit of ra-PrioritizationForAI is set to 0, then RACH prioritization parameters indicated by ra-Prioritization-r16 do not apply to MCS. The ASN.1 structure for ra-PrioritizationForAccessIdentity IE is as follows:

```
ra-PrioritizationForAccessIdentity SEQUENCE {
   ra-Prioritization-r16       RA-Prioritization,
   ra-PrioritizationForAI-r16  BIT STRING (SIZE (2))
}
```

-continued

```
RA-Prioritization ::=        SEQUENCE {
   powerRampingStepHighPriority ENUMERATED
                                {dB0, dB2, dB4, dB6},
   scalingFactorBI              ENUMERATED
OPTIONAL, -- Need R          {zero, dot25, dot5, dot75}
   ...
}
```

After the completion of handover, at some point in time, RA is triggered on a serving cell. Note that there can be several serving cells in a cell group.

If the serving cell is a secondary cell (SCell), the UE performs an RA procedure without applying RACH prioritization.

If the serving cell is a primary cell (PCell), the UE selects between second and third RACH prioritization parameter sets.

If RA procedure is initiated for BFR, the UE selects the second RACH prioritization parameter set for RACH prioritization.

If RA procedure is not initiated for BFR and UE is configured with Access Identity 1 or 2 and third RACH prioritization parameter set is allowed for UE's access identity, the UE selects the third RACH prioritization parameter set for RACH prioritization.

Else the UE does not apply RACH prioritization.

The UE performs an RA procedure with the selected PRACH prioritization parameter.

Selecting Hybrid Automatic Repeat Request (HARQ) Feedback Mechanism for New Radio (NR) Vehicle to Everything (V2X) Group Communication The $4^{th}$ generation (4G) and $5^{th}$ (5G) wireless communication systems support vehicular communication services. Vehicular communication services, represented by V2X services, can consist of the following four different types: vehicle-to-vehicle (V2V), vehicle-to-infrastructure (V2I), vehicle-to-network (V2N), and vehicle-to-pedestrian (V2P). In 5G (also referred as NR or New Radio) wireless communication system, V2X communication is being enhanced to support enhanced V2X use cases, which are broadly arranged into four use case groups:

1) Vehicle platooning enables the vehicles to dynamically form a platoon travelling together. All the vehicles in the platoon obtain information from the leading vehicle to manage this platoon. This information allows the vehicles to drive closer than normal in a coordinated manner, going in the same direction and travelling together.

2) Extended sensors enable the exchange of raw or processed data gathered through local sensors or live video images among vehicles, roadside units, devices of pedestrians, and V2X application servers. The vehicles can increase the perception of their environment beyond what their own sensors can detect and have a more broad and holistic view of the local situation. High data rate is one of the key characteristics.

3) Advanced driving enables semi-automated or full-automated driving. Each vehicle and/or roadside unit (RSU) shares its own perception data obtained from its local sensors with vehicles in proximity, and that allows vehicles to synchronize and coordinate their trajectories or maneuvers. Each vehicle also shares its driving intention with vehicles in proximity.

4) Remote driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

V2X services can be provided by a PC5 interface and/or a Uu interface. Support of V2X services via PC5 interface is provided by NR sidelink (SL) communication or V2X SL communication, which is a mode of communication whereby UEs can communicate with each other directly over the PC5 interface using NR technology or evolved universal mobile telecommunications system (UMTS) terrestrial radio access (EUTRA) technology respectively without traversing any network node. This communication mode is supported when the UE is served by a radio access network (RAN) and when the UE is outside of RAN coverage. Only the UEs authorized to be used for V2X services can perform NR or V2X SL communication.

Figure 2:
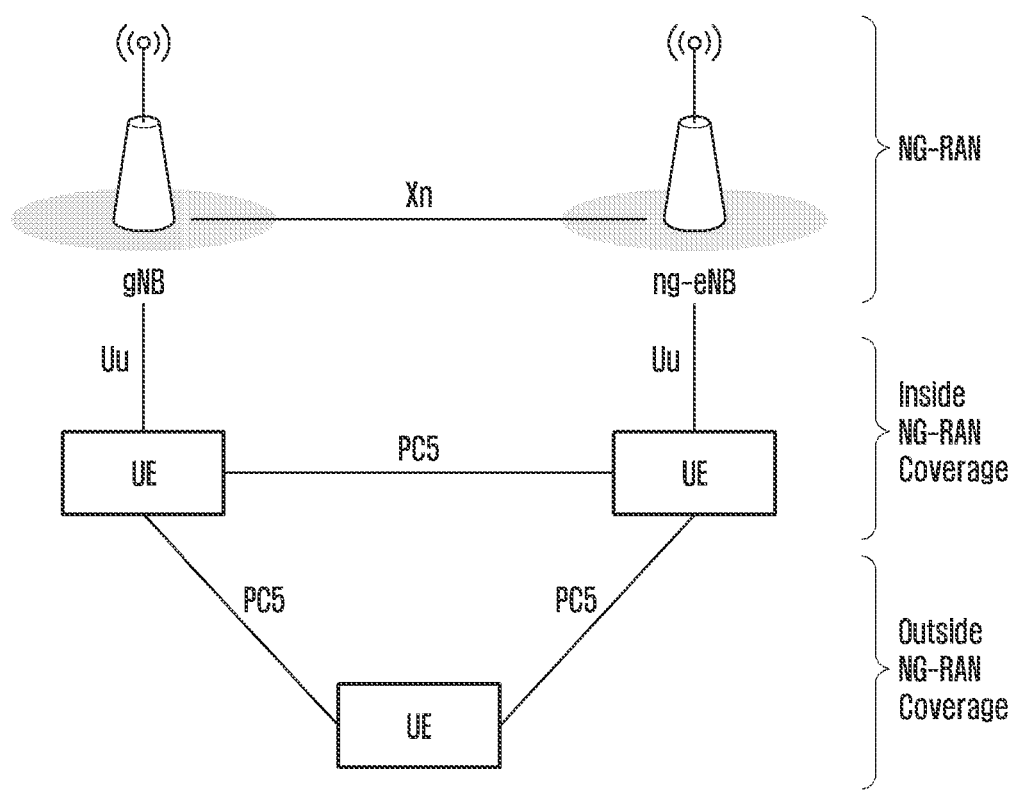
FIG. 2 illustrates support by a next generation (NG)-radio access network (RAN) architecture of a PC5 interface according to an embodiment of the disclosure.

FIG. 2 illustrates support by a next generation (NG)-RAN architecture of a PC5 interface according to an embodiment of the disclosure.

Referring to FIG. 2, in a network of a number Xn of gNB and ng-eNB devices providing an NG-RAN coverage, SL transmission and reception over the PC5 interface are supported when a UE is inside NG-RAN coverage, irrespective of which RRC state the UE is in, and when the UE is outside NG-RAN coverage. Support of V2X services via the PC5 interface can be provided by NR SL communication and/or V2X SL communication. NR SL communication may be used to support services other than V2X services.

SL or PC5 interface also supports UE-to-UE direct communication using the SL resource allocation modes, physical-layer signals/channels, and physical layer procedures below.

Two SL resource allocation modes are supported: mode 1 and mode 2. In mode 1, the SL resource allocation is provided by the network. In mode 2, the UE decides the SL transmission resources in the resource pool(s).

Physical SL control channel (PSCCH) indicates resource and other transmission parameters used by a UE for physical SL shared channel (PSSCH). PSCCH transmission is associated with a demodulation reference signal (DM-RS). SL control information ($1^{st}$ stage SL control information (SCI)) is transmitted on PSCCH.

PSSCH transmits the transport blocks (TBs) of data themselves, control information for HARQ procedures, and channel state information (CSI) feedback triggers, etc. Control information is referred as $2^{nd}$ stage SCI. At least 6 orthogonal frequency division multiplexing (OFDM) symbols within a slot are used for PSSCH transmission. PSSCH transmission is associated with a DM-RS and may be associated with a phase tracking reference signal (PT-RS).

Physical SL feedback channel (PSFCH) carries HARQ feedback over the SL from a UE which is an intended recipient of a PSSCH transmission to the UE which performed the transmission. PSFCH sequence is transmitted in one physical resource block (PRB) repeated over two OFDM symbols near the end of the SL resource in a slot.

The SL synchronization signal consists of SL primary and SL secondary synchronization signals (S-PSS, S-SSS), each occupying 2 symbols and 127 subcarriers. Physical SL broadcast channel (PSBCH) occupies 9 and 5 symbols for normal and extended cyclic prefix cases respectively, including the associated DM-RS.

SL HARQ feedback uses PSFCH and can be operated in one of two options. In one option, which can be configured for unicast and groupcast, PSFCH transmits either ACK or NACK using a resource dedicated to a single PSFCH transmitting UE. In another option, which can be configured for groupcast, PSFCH transmits NACK, or no PSFCH signal is transmitted, on a resource that can be shared by multiple PSFCH transmitting UEs.

For transmitting data over PC5 interface, transmitter UE first transmits $1^{st}$ stage SCI over PSCCH resource. $1^{st}$ stage SCI includes information on the TB such as: priority, frequency resource assignment, time resource assignment, resource reservation period, DM-RS pattern, $2^{nd}$ stage SCI format, modulation and coding scheme (MCS), number of DM-RS port, etc. Transmitter UE then transmits $2^{nd}$ stage SCI over PSSCH. The second stage SCI includes information such as, HARQ process number, new data indicator (NDI), redundancy version (RV), source identifier (ID), destination ID, HARQ feedback enabled/disabled indicator, cast type, CSI request, zone ID, range, etc. Transmitter UE then transmits TB carrying SL MAC protocol data unit (PDU) over PSSCH.

There are two types of HARQ feedback options for NR V2X group communication as described below:

Group Communication HARQ Feedback Option 1 (GC Option 1, also referred as negative only acknowledgement)

In this option, if HARQ packet (i.e., TB) transmitted by the transmitter UE is successfully received by the receiver UE, the receiver UE does not send any HARQ feedback. If the HARQ packet (i.e., TB) is not successfully received by the receiver UE, the receiver UE sends HARQ NACK if the distance between the receiver UE and the transmitter UE is smaller than the communication range. The communication range and its location information are indicated by the transmitter UE in scheduling control information (i.e., $2^{nd}$ stage SCI transmitted by the transmitter UE). Based on location information received from transmitter UE and its location information, the receiver UE calculates the distance.

Group Communication HARQ Feedback Option 2 (GC Option 2, also referred as positive-negative acknowledgement)

In this option, if the HARQ packet (i.e., TB) transmitted by the transmitter UE is successfully received by the receiver UE, the receiver UE sends HARQ ACK. If the HARQ packet (i.e., TB) is not successfully received by the receiver UE, the receiver UE sends HARQ NACK to the transmitter.

The transmitter UE selects the HARQ feedback option and indicates the same to the receiver UE in $2^{nd}$ stage SCI. The issue is how the transmitter UE selects HARQ feedback option.

Figure 3:
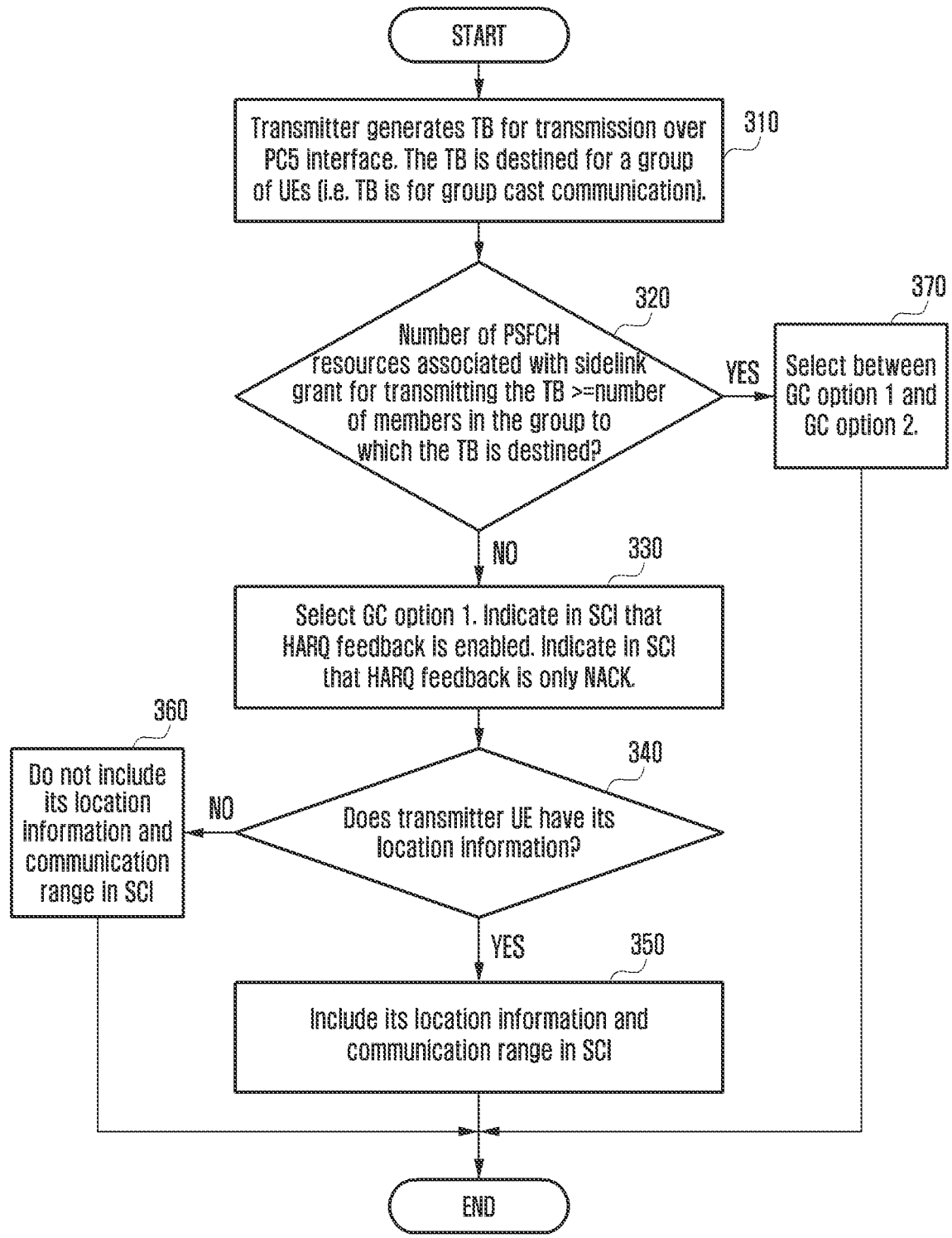
FIG. 3 is a flowchart that illustrates an example operation of a transmitter user equipment (UE) according to an embodiment of the disclosure.

FIG. 3 is a flowchart that illustrates an example operation of a transmitter UE according to an embodiment of the disclosure.

In one embodiment of this disclosure, the selection criteria, i.e., criteria to select the HARQ feedback option can be as follows:

Transmitter UE generates TB for transmission over PC5 interface at operation 310. The TB is destined for a group of UEs (i.e., TB is for groupcast communication).

The transmitter UE then determines whether the number of PSFCH resources associated with SL grant for transmitting the TB is greater than or equal to a number of members in the group to which the TB is destined at operation 320.

In one embodiment, if the number of PSFCH resources associated with SL grant for transmitting the TB (the number of PSFCH resources for a TB can be known from resource pool configuration) is smaller than (i.e., not greater than or equal to) number of members in the group to which the TB is destined (i.e., group whose MAC SDU(s) are scheduled in the TB), transmitter UE selects GC Option 1 at operation 330. The transmitter UE indicates in SCI that HARQ feedback is enabled. It also indicates in SCI that HARQ feedback is only NACK. The transmitter UE identifies whether the transmitter UE has its location information at operation 340. If the transmitter UE has its location information in operation 340, it includes its location information and communication range in SCI at operation 350; otherwise, it does not include its location information and communication range in SCI at operation 360.

In another embodiment, if the number of PSFCH resources associated with SL grant for transmitting the TB (the number of PSFCH resources for a TB can be known from resource pool configuration) is smaller than (i.e., not greater than or equal to) number of members in the group to which the TB is destined (i.e., group whose MAC SDU(s) are scheduled in the TB), the transmitter UE further checks if it has its location information or not. If the transmitter UE has its location information, it selects GC Option 1, includes its location information and communication range in SCI, indicates in SCI that HARQ feedback is enabled, and indicates in SCI that HARQ feedback is only NACK. If the transmitter UE does not have its location information, it indicates in SCI that HARQ feedback is not enabled.

The transmitter UE then transmits the SCI and the TB.

In one embodiment, if the number of PSFCH resources associated with SL grant for transmitting the TB (the number of PSFCH resources for a TB can be known from resource pool configuration) is greater than or equal to number of members in the group to which the TB is destined (i.e., group whose MAC SDU(s) are scheduled in the TB), the transmitter UE can select either GC option 1 or GC option 2 at operation 370. The transmitter UE indicates in SCI that HARQ feedback is enabled.

In another embodiment, if the number of PSFCH resources associated with SL grant for transmitting the TB (the number of PSFCH resources for a TB can be known from resource pool configuration) is greater than or equal to a number of members in the group to which the TB is destined (i.e., group whose MAC SDU(s) are scheduled in the TB), the transmitter UE selects GC option 2, it indicates in SCI that HARQ feedback is enabled, indicates in SCI that HARQ feedback is ACK or NACK, and does not include location information and communication range in SCI.

In another embodiment, if the number of PSFCH resources associated with SL grant for transmitting the TB (the number of PSFCH resources for a TB can be known from resource pool configuration) is greater than or equal to a number of members in the group to which the TB is destined (i.e., group whose MAC SDU(s) are scheduled in the TB), the transmitter UE selects GC option 1. The transmitter UE indicates in SCI that HARQ feedback is enabled. It also indicates in SCI that HARQ feedback is only NACK. If the transmitter UE has its location information, it includes its location information and communication range in SCI; otherwise, it does not include its location information and communication range in SCI.

In another embodiment, if the number of PSFCH resources associated with SL grant for transmitting the TB (the number of PSFCH resources for a TB can be known from resource pool configuration) is greater than or equal to a number of members in the group to which the TB is destined (i.e., group whose MAC SDU(s) are scheduled in the TB), the transmitter UE further checks whether it has its location information or not. If the transmitter UE has its location information, it selects GC option 1, includes its location information and communication range in SCI, indicates in SCI that HARQ feedback is enabled, and indicates in SCI that HARQ feedback is only NACK. If the transmitter UE does not have its location information, it selects GC option 2, indicates in SCI that HARQ feedback is enabled, and indicates in SCI that HARQ feedback is ACK or NACK.

A receiver UE receives SCI and decodes the scheduled TB transmitted by the transmitter UE. Received SCI indicates that HARQ feedback is enabled. If the received SCI indicates that HARQ feedback is NACK only, operation at receiver UE is as follows:

In an embodiment, if the transmitter UE's location and communication range information is not included in the received SCI and the TB is not successfully decoded, the receiver UE transmits HARQ NACK. Note that in this case, the receiver UE does not check for its distance with the transmitter UE.

In an embodiment, if the transmitter UE's location and communication range information is included in the received SCI; and if the receiver UE's location information is not available; and if the TB is not successfully decoded: the receiver UE transmits HARQ NACK. Note that in this case, the receiver UE does not check for its distance with the transmitter UE even if the transmitter UE's location and communication range information is included in the received SCI.

In an embodiment, if the transmitter UE's location and communication range information is included in the received SCI; and if the receiver UE's location information is not available; and if the TB is not successfully decoded: the receiver UE does not transmit HARQ NACK.

In an embodiment, if the transmitter UE's location and communication range information is included in the received SCI; and if the receiver UE's location information is not available; and if the TB is not successfully decoded; and if a skip HARQ feedback indication received from network (e.g., in an RRC message, DCI, or an SL resource configuration) is set to 1: the receiver UE does not transmit HARQ NACK.

In an embodiment, if the transmitter UE's location and communication range information is included in the received SCI; and if the receiver UE's location information is not available; and if the TB is not successfully decoded; and if a skip HARQ feedback indication is set to 0 or is not included/configured: the receiver UE transmits HARQ NACK.

Figure 4:
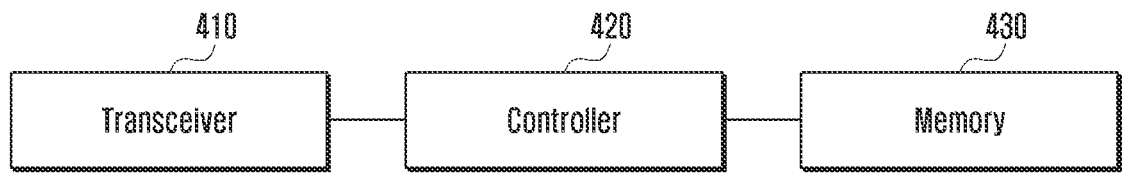
FIG. 4 is a block diagram of a terminal according to an embodiment of the disclosure.

FIG. 4 is a block diagram of a terminal according to an embodiment of the disclosure.

Referring to FIG. 4, a terminal includes a transceiver 410, a controller 420 and a memory 430. The controller 420 may refer to a circuitry, an application-specific integrated circuit (ASIC), a field programmable gate array (FPGA), or at least one processor. The transceiver 410, the controller 420, and the memory 430 are configured to perform the operations of the UE illustrated elsewhere in the figures, e.g., FIGS. 1A, 1B, 2, and 3, or as otherwise described above. Although the transceiver 410, the controller 420, and the memory 430 are shown as separate entities, they may be integrated onto a single chip. The transceiver 410, the controller 420, and the memory 430 may also be electrically connected to or coupled with each other.

The transceiver 410 may transmit and receive signals to and from other network entities, e.g., a base station or another terminal.

The controller 420 may control the UE to perform functions according to the embodiments described above. For example, the controller 420 may be configured to control the transceiver 410 to receive, from a gNB, ra-PrioritizationForAccessIdentity in an initial UL BWP configuration of an UL carrier (i.e., SUL or NUL) of SpCell. PrioritizationForAccessIdentity signaled in the initial UL BWP configuration of the UL carrier (i.e., SUL or NUL) of SpCell may be applicable for RACH prioritization on any UL BWP of that UL carrier of SpCell.

In addition, the controller 420 may be configured to select 4-step RA prioritization parameters for an RA procedure initiated for BFR. For example, if the RA procedure is initiated for BFR; and if 4-step RA prioritization parameters are not configured for BFR; and if the UE's access identity is 1 or 2; and if 4-step RA prioritization parameters are configured for the UE's access identity: the controller 420 may be configured to select 4-step RA prioritization parameters (e.g., powerRampingStepHighPriority, scalingFactorBI) configured for the UE's access identity. Else if the RA procedure is initiated for BFR; and if 4-step RA prioritization parameters are not configured for BFR; and if the UE's access identity is 1 or 2; and if 4-step RA prioritization parameters are not configured for the UE's access identity: the controller 420 may be configured to do not apply RA prioritization to this RA procedure, i.e., a backoff scaling factor is set to 1 and a power ramping step is applied from common configuration.

In addition, the controller 420 may be configured to select 4-step RA prioritization parameters for an MPS/MCS UE for an RA procedure initiated for handover. For example, if the RA procedure is initiated for handover; and if 4-step RA prioritization parameters are not configured for handover; and if the UE's access identity is 1 or 2; and if 4-step RA prioritization parameters are configured for the UE's access identity: the controller 420 may be configured to select 4-step RA prioritization parameters (e.g., powerRampingStepHighPriority, scalingFactorBI) configured for the UE's access identity. Else if the RA procedure is initiated for handover; and if 4-step RA prioritization parameters are not configured for handover; and if the UE's access identity is 1 or 2; and if 4-step RA prioritization parameters are not configured for the UE's access identity: the controller 420 may be configured to do not apply RA prioritization to this RA procedure, i.e., a backoff scaling factor is set to 1 and a power ramping step is applied from common configuration.

In addition, the controller 420 may be configured to select 2-step RA prioritization parameters for an MPS/MCS UE for an RA procedure initiated for BFR. For example, if the RA procedure is initiated for BFR; and if 2-step RA prioritization parameters are not configured for BFR; and if the UE's access identity is 1 or 2; and if 2-step RA prioritization parameters are configured for the UE's access identity: the controller 420 may configured to select 2-step RA prioritization parameters (e.g., powerRampingStepHighPriority, scalingFactorBI) configured for the UE's access identity. Else if the RA procedure is initiated for BFR; and if 2-step RA prioritization parameters are not configured for BFR; and if the UE's access identity is 1 or 2; and if 2-step RA prioritization parameters are not configured for the UE's access identity: the controller 420 may be configured to do not apply RA prioritization to this RA procedure, i.e., a backoff scaling factor is set to 1 and a power ramping step is applied from common configuration.

In addition, the controller 420 may be configured to select 2-step RA prioritization parameters for an MPS/MCS UE for an RA procedure initiated for handover. For example, if the RA procedure is initiated for handover; and if 2-step RA prioritization parameters are not configured for handover; and if the UE's access identity is 1 or 2; and if 2-step RA prioritization parameters are configured for the UE's access identity: the controller 420 may be configured to select 2-step RA prioritization parameters (e.g., powerRampingStepHighPriority, scalingFactorBI) configured for the UE's access identity. Else if the RA procedure is initiated for handover; and if 2-step RA prioritization parameters are not configured for handover; and if the UE's access identity is 1 or 2; and if 2-step RA prioritization parameters are not configured for the UE's access identity: the controller 420 may be configured to do not apply RA prioritization to this RA procedure, i.e., a backoff scaling factor is set to 1 and a power ramping step is applied from common configuration.

In addition, if SCI indicates negative only acknowledgement; and if a receiver UE does not have its location information; and if TB is not successfully received: the controller 420 of the receiver UE may be configured to control the transceiver 410 to transmit an HARQ NACK without checking its distance from a transmitter UE. Else if the receiver UE has its location information and TB is not successfully received, the controller 420 of the receiver UE may be configured to determine whether to transmit an HARQ NACK or not by checking its distance from the transmitter UE.

In addition, the controller 420 may be configured to select HARQ feedback mechanism for NR V2X group communication.

In an embodiment, the operations of the terminal may be implemented using the memory 430 storing corresponding program codes. Specifically, the terminal may be equipped with the memory 430 to store program codes implementing desired operations. To perform the desired operations, the controller 420 may read and execute the program codes stored in the memory 430 by using a processor or a central processing unit (CPU).

Figure 5:
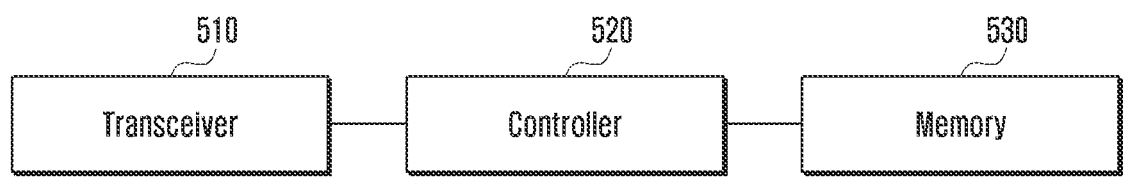
FIG. 5 is a block diagram of a base station according to an embodiment of the disclosure.

FIG. 5 is a block diagram of a base station according to an embodiment of the disclosure.

Referring to FIG. 5, a base station includes a transceiver 510, a controller 520, and a memory 530. The controller 520 may refer to a circuitry, an ASIC, an FPGA, or at least one processor. The transceiver 510, the controller 520, and the memory 530 are configured to perform the operations of the gNB illustrated elsewhere in the figures, e.g., FIGS. 1A, 1B, 2, and 3, or as otherwise described above. Although the transceiver 510, the controller 520, and the memory 530 are shown as separate entities, they may be integrated onto a single chip. The transceiver 510, the controller 520, and the memory 530 may also be electrically connected to or coupled with each other.

The transceiver 510 may transmit and receive signals to and from other network entities, e.g., a terminal.

The controller 520 may control the gNB to perform functions according to the embodiments described above. For example, the controller 520 may be configured to control the transceiver 510 to transmit, to a UE, ra-PrioritizationForAccessIdentity in an initial UL BWP configuration of an UL carrier (i.e., SUL or NUL) of SpCell. PrioritizationForAccessIdentity may be signaled in the initial UL BWP configuration of the UL carrier (i.e., SUL or NUL) of SpCell.

In an embodiment, the operations of the base station may be implemented using the memory 530 storing corresponding program codes. Specifically, the base station may be equipped with the memory 530 to store program codes implementing desired operations. To perform the desired operations, the controller 520 may read and execute the program codes stored in the memory 530 by using a processor or a CPU.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. A method of random access, the method comprising:
receiving, from a base station, at least one of a first set of random access prioritization parameters, a second set of random access prioritization parameters, and a third set of random access prioritization parameters;
identifying whether a random access procedure is initiated for beam failure recovery;
identifying whether the second set of random access prioritization parameters is received from the base station in case that the random access procedure is initiated for beam failure recovery;
identifying whether the first set of random access prioritization parameters is received from the base station in case that the second set of random access prioritization parameters is not received from the base station; and
applying the first set of random access prioritization parameters during the random access procedure in case that the first set of random access prioritization parameters is received from the base station.

2. The method of claim 1,
wherein the first set of random access prioritization parameters is received for access identity in an initial uplink bandwidth part configuration of a special cell (SpCell) or a system information block 1 (SIB1),
wherein the second set of random access prioritization parameters is received for beam failure recovery in a beam failure recovery configuration, and
wherein the third set of random access prioritization parameters is received for handover in a random access dedicated configuration.

3. The method of claim 1, further comprising:
identifying whether the random access procedure is initiated for handover;
identifying whether the first set of random access prioritization parameters is received from the base station in case that the random access procedure is not initiated for handover and beam failure recovery; and
applying the first set of random access prioritization parameters during the random access procedure in case that the first set of random access prioritization parameters is received from the base station.

4. The method of claim 3, wherein a random access prioritization is not applied to the random access procedure in case the first set of random access prioritization parameters is not received from the base station.

5. The method of claim 1, wherein a random access prioritization is not applied to the random access procedure in case random access procedure is initiated for beam failure recovery and both the first and second set of random access prioritization parameters are not received from the base station.

6. The method of claim 1, wherein a set of random access prioritization parameters includes at least one of a power ramping step and a backoff scaling factor.

7. A method of random access, the method comprising:
receiving, from a base station, at least one of a first set of random access prioritization parameters, a second set of random access prioritization parameters, and a third set of random access prioritization parameters;
identifying whether a random access procedure is initiated for handover;
identifying whether the third set of random access prioritization parameters is received from the base station in case that the random access procedure is initiated for handover;
identifying whether the first set of random access prioritization parameters is received from the base station in case that the third set of random access prioritization parameters is not received from the base station; and
applying the first set of random access prioritization parameters during the random access procedure in case that the first set of random access prioritization parameters is received from the base station.

8. The method of claim 7,
wherein the first set of random access prioritization parameters is received for access identity in an initial uplink bandwidth part configuration of a special cell (SpCell) or a system information block 1 (SIB1),
wherein the second set of random access prioritization parameters is received for beam failure recovery in a beam failure recovery configuration, and
wherein the third set of random access prioritization parameters is received for handover in a random access dedicated configuration.

9. The method of claim 7, wherein a random access prioritization is not applied to the random access procedure in case that the random access procedure is initiated for handover and both the first and third set of random access prioritization parameters are not received from the base station.

10. The method of claim 7, wherein a set of random access prioritization parameters includes at least one of a power ramping step and a backoff scaling factor.

11. A terminal in a wireless communication system, the terminal comprising:
a transceiver; and
a controller coupled with the transceiver and configured to:
receive, from a base station via the transceiver, at least one of a first set of random access prioritization parameters, a second set of random access prioritization parameters, and a third set of random access prioritization parameters,
identify whether a random access procedure is initiated for beam failure recovery,
identify whether the second set of random access prioritization parameters is received from the base station in case that the random access procedure is initiated for beam failure recovery,
identify whether the first set of random access prioritization parameters is received from the base station in case that the second set of random access prioritization parameters is not received from the base station, and
apply the first set of random access prioritization parameters during the random access procedure in case that the first set of random access prioritization parameters is received from the base station.

12. The terminal of claim 11,
wherein the first set of random access prioritization parameters is received for access identity in an initial uplink bandwidth part configuration of a special cell (SpCell) or a system information block 1 (SIB1), wherein the second set of random access prioritization parameters is received for beam failure recovery in a beam failure recovery configuration, and wherein the third set of random access prioritization parameters is received for handover in a random access dedicated configuration.

13. The terminal of claim 11, wherein the controller is further configured to:

identify whether the random access procedure is initiated for handover, identify whether the first set of random access prioritization parameters is received from the base station in case that the random access procedure is not initiated for handover and beam failure recovery, and apply the first set of random access prioritization parameters during the random access procedure in case that the first set of random access prioritization parameters is received from the base station.

14. The terminal of claim 13, wherein the controller is further configured to not apply a random access prioritization to the random access procedure in case the first set of random access prioritization parameters is not received from the base station.

15. The terminal of claim 11, wherein the controller is further configured to not apply a random access prioritization to the random access procedure in case random access procedure is initiated for beam failure recovery and both the first and second set of random access prioritization parameters are not received from the base station.

16. The terminal of claim 11, wherein a set of random access prioritization parameters includes at least one of a power ramping step and a backoff scaling factor.

17. A terminal in a wireless communication system, the terminal comprising:

a transceiver; and a controller coupled with the transceiver and configured to:

receive, from a base station via the transceiver, at least one of a first set of random access prioritization parameters, a second set of random access prioritization parameters, and a third set of random access prioritization parameters, identify whether a random access procedure is initiated for handover, identify whether the third set of random access prioritization parameters is received from the base station in case that the random access procedure is initiated for handover, identify whether the first set of random access prioritization parameters is received from the base station in case that the third set of random access prioritization parameters is not received from the base station, and apply the first set of random access prioritization parameters during the random access procedure in case that the first set of random access prioritization parameters is received from the base station.

18. The terminal of claim 17, wherein the first set of random access prioritization parameters is received for access identity in an initial uplink bandwidth part configuration of a special cell (SpCell) or a system information block 1 (SIB1), wherein the second set of random access prioritization parameters is received for beam failure recovery in a beam failure recovery configuration, and wherein the third set of random access prioritization parameters is received for handover in a random access dedicated configuration.

19. The terminal of claim 17, wherein the controller is further configured to not apply a random access prioritization to the random access procedure in case that the random access procedure is initiated for handover and both the first and third set of random access prioritization parameters are not received from the base station.

20. The terminal of claim 17, wherein a set of random access prioritization parameters includes at least one of a power ramping step and a backoff scaling factor.

* * * * *